(12) United States Patent
Sediq et al.

(10) Patent No.: US 9,042,933 B2
(45) Date of Patent: May 26, 2015

(54) INTER-CELL INTERFERENCE COORDINATION FOR WIRELESS COMMUNICATION SYSTEMS

(75) Inventors: Akram Bin Sediq, Ottawa (CA); Rainer Schoenen, Ottawa (CA); Halim Yanikomeroglu, Ottawa (CA); Gamini Senarath, Ottawa (CA); Zhijun Chao, Shanghai (CN); Ho Ting Cheng, Nepean (CA); Peiying Zhu, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 531 days.

(21) Appl. No.: 13/438,624

(22) Filed: Apr. 3, 2012

(65) Prior Publication Data

US 2013/0095872 A1    Apr. 18, 2013

Related U.S. Application Data

(60) Provisional application No. 61/547,506, filed on Oct. 14, 2011.

(51) Int. Cl.
*H04B 7/00* (2006.01)
*H04B 1/00* (2006.01)
*H04B 1/04* (2006.01)
*H04W 52/24* (2009.01)
*H04W 52/22* (2009.01)
*H04W 52/26* (2009.01)

(52) U.S. Cl.
CPC .......... *H04W 52/244* (2013.01); *H04W 52/225* (2013.01); *H04W 52/267* (2013.01)

(58) Field of Classification Search
CPC .............................. H04W 52/16; H04W 52/34
USPC ............................ 455/522, 509, 507, 450, 69
See application file for complete search history.

(56) References Cited

U.S. PATENT DOCUMENTS

| | | | | |
|---|---|---|---|---|
| 2008/0298486 | A1* | 12/2008 | Venturino et al. | 375/260 |
| 2011/0136494 | A1* | 6/2011 | Kim et al. | 455/450 |
| 2012/0282889 | A1* | 11/2012 | Tanaka et al. | 455/405 |

* cited by examiner

*Primary Examiner* — Tilahun B Gesesse

(57) ABSTRACT

For each base station, transmit power level variables (I values) for each resource block allocated by the base station are initialized. The I values are used in a model to find sub-gradients for each base station. Neighboring base stations exchange the sub-gradients. For each base station, the base station's sub-gradient and the base station's neighbors' sub-gradients are used in the model to update the I values. Neighboring base stations then exchange the updated I values. For each base station, the base station's updated I value and the base station's neighbors' updated I values are used in the model to update the initial sub-gradients. The updated sub-gradients are then exchanged and used for another update of the I values. After a number of iterations, the I values are used to establish a transmit power level per resource block.

26 Claims, 14 Drawing Sheets

INTER-CELL INTERFERENCE COORDINATION FOR WIRELESS COMMUNICATION SYSTEMS

RELATED APPLICATION

This application claims priority to U.S. Provisional Application No. 61/547,506, titled "Distributed ICIC Scheme for Wireless Communication Systems," filed on Oct. 14, 2011, which is hereby incorporated by reference in its entirety.

BACKGROUND

Conventional wireless networks are implemented as cellular systems that include a number of base stations. A base station communicates with user terminals that are located inside the cell served by the base station. Unfortunately, cellular wireless networks are subject to inter-cell interference problems that can limit the capacity (data rates) of the network. Inter-cell interference is the interference experienced at a first user terminal due to other user terminals in cells outside the cell in which the first user terminal is located.

Orthogonal Frequency Division Multiple Access (OFDMA) is a multiple access scheme for "fourth generation" (4G) cellular wireless standards, such as Long-Term Evolution (LTE), LTE-Advanced, and WiMAX (Worldwide Interoperability for Microwave Access). Among the advantages offered by OFDMA is its scheduling flexibility, because users can be scheduled in both time and frequency, which can be exploited to gain time, frequency, and multi-user diversity.

In order to achieve high data rates in 4G and beyond-4G networks, aggressive frequency reuse is inevitable due to the scarcity of the radio resources. Reuse 1 (universal reuse), in which all radio resources are reused in every sector, is an example of an aggressive frequency reuse scheme. While reuse 1 can potentially achieve high aggregate system throughput, it jeopardizes the throughput experienced by user terminals close to the edge of a cell, due to the inter-cell interference experienced by those user terminals. Therefore, it is important for the network to use robust and efficient interference mitigation techniques.

Conventionally, inter-cell interference is mitigated by static resource partitioning and frequency/sector planning (clustering), in which nearby sectors are assigned orthogonal resources. A common example is reuse 3 (cluster size=3 sectors), where adjacent sectors are assigned orthogonal channels. Although such techniques can reduce inter-cell interference and improve cell-edge throughput, they suffer from at least two drawbacks: static resource planning, and a priori frequency/sector planning. With static resource planning, the aggregate network throughput is significantly reduced because each sector can use only a fraction of the available resources, equal to the reciprocal of the reuse factor (e.g., in reuse 3, only one-third of the resources are available to a sector). Conventional a priori frequency/sector planning may not be possible in emerging wireless networks where new multi-tier network elements (such as relays, femto-/pico-base stations, and distributed antenna ports) are expected to be installed in an ad hoc manner, without prior planning.

In an attempt to address the effects of static resource partitioning and a priori frequency/sector planning on aggregate network throughput, Fractional Frequency Reuse (FFR) schemes have been proposed. The key idea in FFR is to assign lower reuse factors for user terminals near the cell center and higher reuse factors for user terminals at the cell edge. The motivation behind FFR is that cell-edge user terminals are more vulnerable to inter-cell interference than cell-center user terminals. Soft Frequency Reuse (SFR) and Partial Frequency Reuse (PFR) are two variations of FFR. While FFR schemes recover some of the throughput lost due to static resource partitioning, they require frequency/cell planning a priori, which is not compatible with the way future cellular networks are expected to be installed as mentioned above. As a result, an efficient inter-cell interference coordination (ICIC) scheme would be beneficial to the success of future cellular networks.

SUMMARY

Embodiments of an ICIC model for wireless networks, and methods for implementing such a model, are described. In one embodiment, the ICIC model is implemented in a distributed manner as follows. Transmit power level variables (I values) for each resource block allocated by each base station in a wireless network are initialized in the ICIC model. The initial I values are used in the ICIC model to find initial sub-gradients for each base station, where the sub-gradients for a base station maximize a specified measure of utility as calculated by the ICIC model. The measure of utility may be, for example, the weighted sum data transmission rate of all user terminals in a sector. Neighboring base stations exchange the initial sub-gradients. For each base station, the base station's initial sub-gradient and the initial sub-gradients from the base station's neighbors are used in the ICIC model to update the initial I values. Neighboring base stations then exchange the updated I values. For each base station, the base station's updated I value and the updated I values from the base station's neighbors are used in the ICIC model to update the initial sub-gradients. The updated sub-gradients are then exchanged between base stations and used as the basis for another update of the I values, and so on. This iterative process is repeated a prescribed number of times, at which point the current I values are used to establish a transmit power level per resource block. The current I values can also be used for purposes of scheduling the resource blocks; that is, an I value for a particular resource block can be used to determine whether or not the resource block can be allocated to a particular user terminal.

The transmit power level per resource block can be determined per transmit time interval (TTI) or for some number of TTIs, depending on how frequently the iterative process is performed. In one embodiment, there are two possible power levels per resource block—a resource block is either turned on (available for allocation) or turned off (not available for allocation). In another embodiment, more than two power levels are possible.

In an alternative embodiment, the ICIC model can be implemented at a centralized node that can communicate with each of the base stations.

The ICIC model is relatively low in complexity and its implementation is expected to result in improved network performance. These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
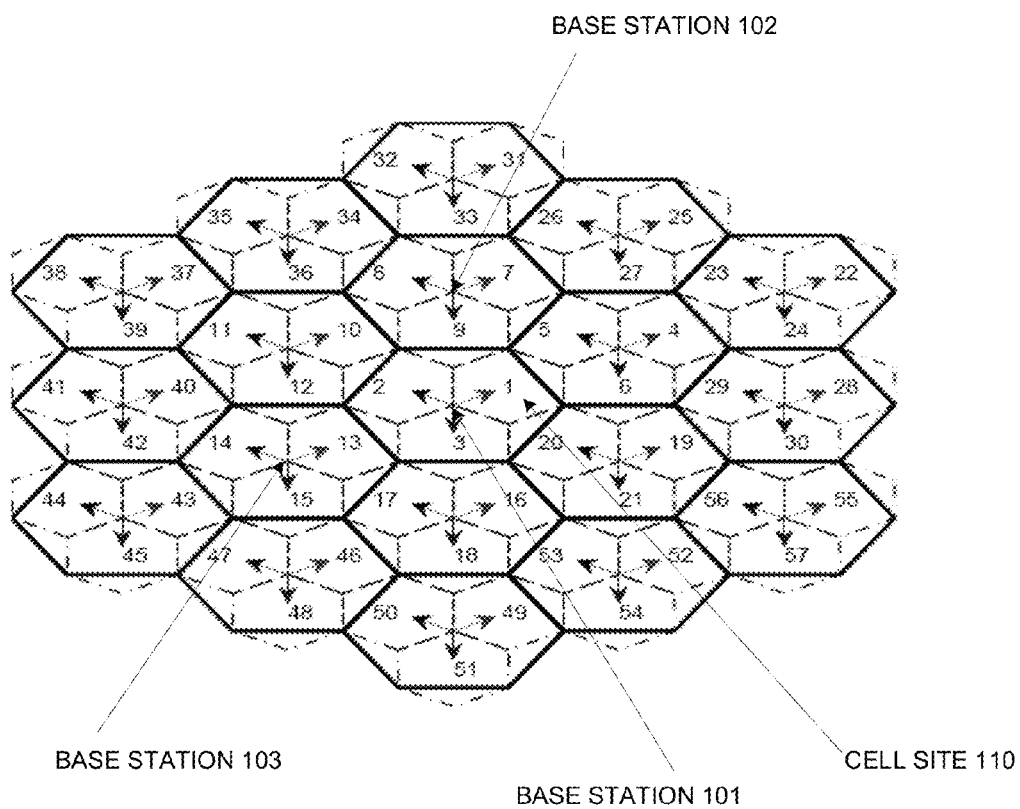
FIG. 1 illustrates elements in a wireless network upon which embodiments according to the present disclosure can be practiced.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Embodiments described herein may be discussed in the general context of computer-executable instructions, such as program modules, residing on some form of computer-readable storage medium executed by one or more computers or other devices. By way of example, and not limitation, computer-readable storage media may comprise non-transitory computer-readable storage media. Non-transitory computer-readable storage media includes all computer-readable media except for a transitory, propagating signal. Computer-readable storage media includes volatile and nonvolatile, removable and non-removable media implemented in any method or technology for storage of information such as computer-readable instructions, data structures, program modules or other data. Generally, program modules include routines, programs, objects, components, data structures, etc., that perform particular tasks or implement particular abstract data types. The functionality of the program modules may be combined or distributed as desired in various embodiments.

Overview

Embodiments of an ICIC model for wireless networks, and methods for implementing such a model, are described.

In a distributed implementation, information is exchanged between neighboring base stations. The information that is exchanged includes sub-gradients (as opposed to gradients). Generally speaking, a sub-gradient can be defined as follows: if f: $U \rightarrow R$ is a real-valued convex function defined on a convex open set in the Euclidean space $R^n$, then a vector v in that space is called a sub-gradient at a point $x_0$ in U if for an x in U one has $f(x)-f(x_0) \geq v \cdot (x-x_0)$ where the dot denotes the dot product. A sub-gradient is useful when f(x) is not differentiable. If f(x) is differentiable, then the only sub-gradient is the gradient. The gradient of a scalar field is a vector field that points in the direction of the greatest rate of increase of the scalar field, and whose magnitude is that rate of increase.

The information that is exchanged between neighboring base stations also includes power decision variables (referred to as I values). In essence, the value of an I value establishes a transmit power level for a corresponding resource block. A resource block is essentially a group of resource elements, where each resource element includes some combination of time and frequency resources that can be allocated by a base station to the various user terminals in the cell serviced by the base station. In one embodiment, each I value has two possible values: one value turns off the corresponding resource block (the resource block is not available for allocation), and the other value turns on the resource block (the resource block is available for allocation).

According to the ICIC model, the amount of increase or decrease in the I values is proportional to the effective sub-gradient in each sector for each resource block. A sector is essentially a portion of a cell served by a base station; a cell includes multiple sectors (e.g., three sectors). Generally speaking, the sub-gradients correspond to the effect of transmit (downlink) power level for a resource block on a measure of utility for a sector. The measure of utility may be, for example, the weighted sum data transmission rate of all user terminals in a sector.

An embodiment of the ICIC model is implemented as follows. Transmit power level variables (I values) for each resource block allocated by each base station in a wireless network are initialized in the ICIC model. The initial I values are used in the ICIC model to find initial sub-gradients for each base station, where the sub-gradients for a base station maximize a specified measure of utility as calculated by the ICIC model. The measure of utility may be, for example, the weighted sum data transmission rate of all user terminals in a sector. Neighboring base stations exchange the initial sub-gradients. For each base station, the base station's initial sub-gradient and the initial sub-gradients from the base station's neighbors are used in the ICIC model to update the initial I values. Neighboring base stations then exchange the updated I values. For each base station, the base station's updated I value and the updated I values from the base station's neighbors are used in the ICIC model to update the initial sub-gradients. The updated sub-gradients are then exchanged between base stations and used as the basis for another update of the I values, and so on. This iterative process is repeated a prescribed number of times, at which point the current I values are rounded and used to establish a transmit power level per resource block. The current I values can also be used for purposes of scheduling the resource blocks; that is, an I value for a particular resource block can be used to determine whether or not the resource block can be allocated to a particular user terminal.

Embodiments of the ICIC model can be implemented in a distributed manner (e.g., on each of the base stations) as just described, or in a centralized manner (e.g., on a centralized node that is in communication with each of the base stations). The I values can be determined per TTI or for some number of TTIs, depending on how frequently the iterative process is performed.

System Examples and Representation

An example of a wireless network 100 upon which embodiments according to the disclosure can be implemented is shown in FIG. 1. The network 100 may be deployed as a HetNet (heterogeneous network) including a Third Generation Partnership Project (3GPP) Long-Term Evolution (LTE) compliant communications system. A HetNet includes base stations that transmit at different power levels. For example, the network 100 may include base stations that transmit at standard power levels as well as lower power nodes that are known as pico cells and femto cells. Pico cells transmit at power levels that can cover hotel lobbies, portions of shopping malls, etc., and femto cells transmit at power levels that can cover single residential units, for example.

However, embodiments according to the present disclosure are not limited to a HetNet that includes a 3GPP LTE compliant communications system. Embodiments according to the present disclosure may be applied to, for example: other HetNet deployments such as, but not limited to, 3GPP LTE-Advanced, WiMAX, and the like; other compliant communications systems; and HetNet deployment with non-standards compliant communication systems.

In the embodiment of FIG. 1, the network 100 includes K hexagonal sectors (e.g., sectors 1-57) served by K/3 base stations (e.g., base stations 101-103; not all base stations are labeled). In such an embodiment, each base station is equipped with a tri-sector antenna to serve a cell site (exemplified by cell site 110; not all cell sites are labeled) that includes three (3) sectors. Each base station can communicate with its neighboring base stations.

The network 100 can also include a number of user terminals (not shown). A user terminal can be any device used by an end user to communicate such as, but not limited to, a handheld phone, smart phone, computer system equipped with a wireless adapter, mobile station, subscriber, wireless node, subscriber, user, terminal, and the like. A user terminal may also be known as user equipment. The network 100 may include other elements such as, but not limited to, a relay node (not shown) and a distributed antenna port.

Figure 2:
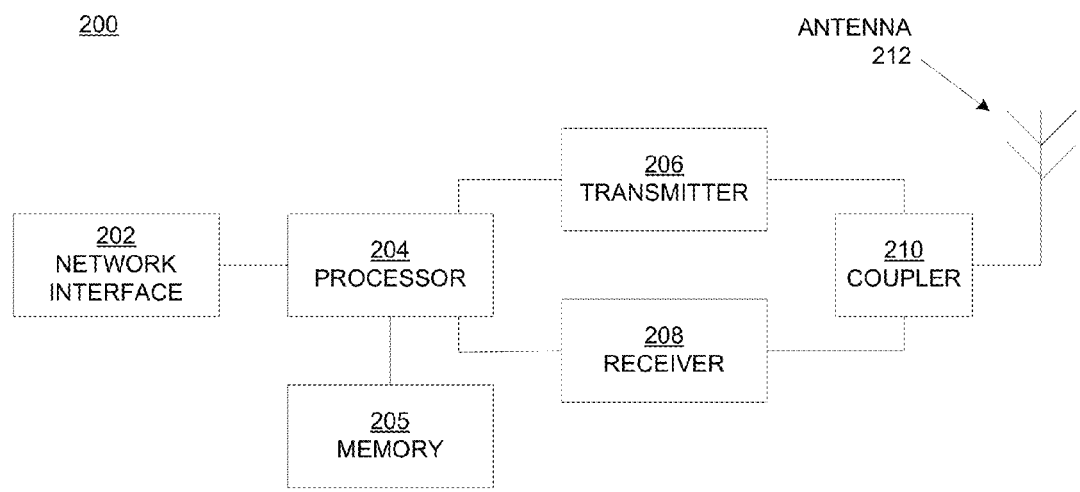
FIG. 2 is a block diagram of a base station according to an embodiment of the present disclosure.

A base station may also be known as a node, a base transceiver station, a Node B (NB), an evolved NB, an access point, or a communications controller. A block diagram of an example of a base station 200 is provided in FIG. 2. The base station 200 is analogous to any of the base stations 101-103 of FIG. 1. In the embodiment of FIG. 2, the base station 200 includes a processor 204 coupled to a memory 205, and also coupled to a transmitter 206 and a receiver 208. In one embodiment, the base station 200 includes a network interface 202. The transmitter 206 and receiver 208 are coupled to an antenna 212 via a coupler 210. Alternatively, the transmitter 206 and receiver 208 may be implemented as a transceiver.

In one embodiment, OFDMA is used as the multiple access scheme, and each resource block consists of $N_S$ OFDMA symbols in the time dimension and $N_f$ sub-carriers in the frequency dimension (in LTE, $N_S=7$ and $N_f=12$). The total number of resource blocks is denoted by N.

The number of user terminals per sector is denoted by M. The base stations and the user terminals are assumed to have single antenna each. Each user terminal estimates and reports to its serving base station the channel from its serving sector's antenna and from the first-tier interfering sectors. The SINR (signal to interference-plus-noise ratio) observed by user terminal m in sector k on resource block n can be expressed as:

$$\Gamma_{m,n}^k = \frac{P_C H_{m,n}^{k,k}}{P_c \sum_{\tilde{k}=1,\tilde{k}\neq k}^{K} (1-I_n^{\tilde{k}}) H_{m,n}^{k,\tilde{k}} + P_N}, \quad (1)$$

where $P_C$ represents the transmitted power per resource block, $P_N$ represents the thermal noise power per resource block, $I_n^k$ is a binary variable (referred to as a transmit power level variable) indicating whether resource block n is restricted in sector k ($I_n^k=1$) or not ($I_n^k=0$), and $H_{m,n}^{k,\tilde{k}}$ represents the channel gain from sector $\tilde{k}$ on resource block n to user terminal m served by sector k. If restricted, the resource block is not available to be allocated by a base station to a user terminal; if not restricted, the resource block is available to be allocated by a base station to a user terminal. $H_{m,n}^{k,\tilde{k}}$ captures large-scale channel variations (due to distance-dependent attenuation and shadowing), antenna gains, and multipath fading. The achievable data transmission rate on resource block n of user terminal m in sector k is given by:

$$R_{m,n}^k = f(\Gamma_{m,n}^k) \quad (2)$$

where $f(\cdot)$ is the adaptive modulation and coding (AMC) function that maps SINR to rate. The function $f(\cdot)$ is assumed to be a non-decreasing function (not necessarily continuous), which is the case for all practical AMC schemes. Finally, full-buffer traffic model is assumed.

Problem Statement

Consider the following generic scheduler implemented in sector k, without ICIC. This scheduler assigns resource block n in subframe t by solving the following:

$$\underset{x_{m,n}^k, \forall m}{\text{maximize}} \sum_{m=1}^{M} \alpha_m^k x_{m,n}^k R_{m,n}^k [t] \quad (3a)$$

$$\text{subject to } \sum_{m=1}^{M} x_{m,n}^k = 1 \quad (3b)$$

$$x_{m,n}^k \in \{0, 1\}, \forall m, \quad (3c)$$

where $\alpha_m^k$ is the weight for user terminal m in sector k, $x_{m,n}^k$ are the optimization binary decision variables such that $x_{m,n}^k=1$ when resource block n is assigned (allocated) to user terminal m in sector k, and $x_{m,n}^k=0$ otherwise. Constraint (3b) ensures that each resource block is assigned to only one user in sector k. The user (user terminal) weights are given by $$\alpha_m^k = \left(\frac{1}{\bar{R}_m^k[t-1]}\right)^\mu,$$

where $\bar{R}_m^k[t-1]$ is the average rate for user terminal m in sector k in the previous frame (t−1), averaged over a window of $N_{PF}$ frames using exponentially-weighted low-pass filter, where $\bar{R}_m^k[t]$ is given by:

$$\bar{R}_m^k[t] = \frac{1}{N_{PF}} \sum_{n=1}^{N} x_{m,n}^k R_{m,n}^K[t] + \left(1 - \frac{1}{N_{PF}}\right) \bar{R}_m^k[t-1].$$

Various degrees of fairness-throughput tradeoff can be achieved by varying the fairness exponent μ. As μ increases, the degree of fairness increases and the total throughput decreases, and vice versa. For example, the max-SINR scheduler corresponds to the case where μ=0, and the proportional-fair scheduler corresponds to the case where μ=1. Another way to vary the degree of fairness-throughput tradeoff is to impose a minimum average rate ($\bar{R}_{min}$) and update $\alpha_m^k$.

To simplify the notation, the subframe index [t] is dropped from this point forward in the discussion. The solution to equation (3a-c) is given by equation (3d):

$$x_{m,n}^{*k} = \begin{cases} 1, & m = \underset{m}{\mathrm{argmax}} \; \alpha_m^k R_{m,n}^k, \\ 0, & m \neq \underset{m}{\mathrm{argmax}} \; \alpha_m^k R_{m,n}^k. \end{cases} \quad (3d)$$

A goal is to develop and implement an ICIC model that increases the utility of the network, which is defined as the sum of utilities of all sectors. Generally speaking, a utility is a numerical rating that is assigned to each possible outcome; in that context, it is desirable to develop and implement an ICIC model that maximizes the utility calculated according to the model. As used herein, overall or network utility refers to a way of rating network performance, and local or sector utility refers to a way of rating performance within a sector. Overall utility may be, for example, the weighted sum data transmission rate of all user terminals in the network, and local utility may be, for example, the weighted sum data transmission rate of all user terminals in a sector. Utility may be defined in terms of Quality of Service. In general, any concave differentiable utility can be maximized in the long term average rate, by updating the weights $\alpha_m^k$ dynamically in each subframe. This can be accomplished by choosing the weights $\alpha_m^k$ (at subframe t) to be the marginal utility (the gradient of the utility), evaluated at the current average rate $\bar{R}_m^k[t-1]$.

In one embodiment, the goal of developing and implementing an ICIC model that increases the utility of the network can be formulated as:

$$\underset{x_{m,n}^k, I_n^k, \forall m, k}{\mathrm{maximize}} \sum_{k=1}^{K} \sum_{m=1}^{M} \alpha_m^k x_{m,n}^k R_{m,n}^k \quad (4a)$$

$$\text{subject to } \sum_{m=1}^{M} x_{m,n}^k = 1 - I_n^k, \forall k \quad (4b)$$

$$x_{m,n}^k, I_n^k \in \{0,1\}, \forall m, k \quad (4c)$$

where the binary variables $I_n^k$ are introduced such that $I_n^k=1$ when the use of resource block n is restricted in sector k (e.g., the resource block is turned off, or is assigned a lower transmit/downlink power level relative to another power level) and $I_n^k=0$ otherwise (e.g., the resource block is turned on, or is assigned a higher transmit/downlink power level relative to another power level). As noted above, the variables $I_n^k$ may be referred to as transmit power level variables. Constraint (4b) ensures that each resource block n is assigned to only one user terminal in sector k, given that resource block n is not restricted in sector k.

Equation (4a-c) is difficult to solve for the following reasons. For one, this problem belongs to the class of non-linear binary combinatorial optimization problems ($R_{m,n}^k$ is a non-linear function of $I_n^k$), which are generally difficult to solve in polynomial time. Moreover, the objective function is dependent on the AMC strategy that is used. Hence, a solution for a given AMC strategy may not be an adequate solution for another AMC strategy. Because AMC strategies are operator-dependent, it is desirable to develop a model that is independent of the chosen AMC strategy. Finally, it is desirable to solve equations (4a-c) in a distributed manner (e.g., across base stations) rather than a centralized manner because some standards (such as LTE, LTE-Advanced, WiMAX) do not support a centralized controller. Embodiments of the ICIC model presented in this disclosure address these shortcomings. That is, embodiments of the ICIC model can be solved in polynomial time, are independent of AMC strategy, and can be solved in a distributed manner (although it can also be solved in a centralized manner).

Model Development and Description

Figure 3:
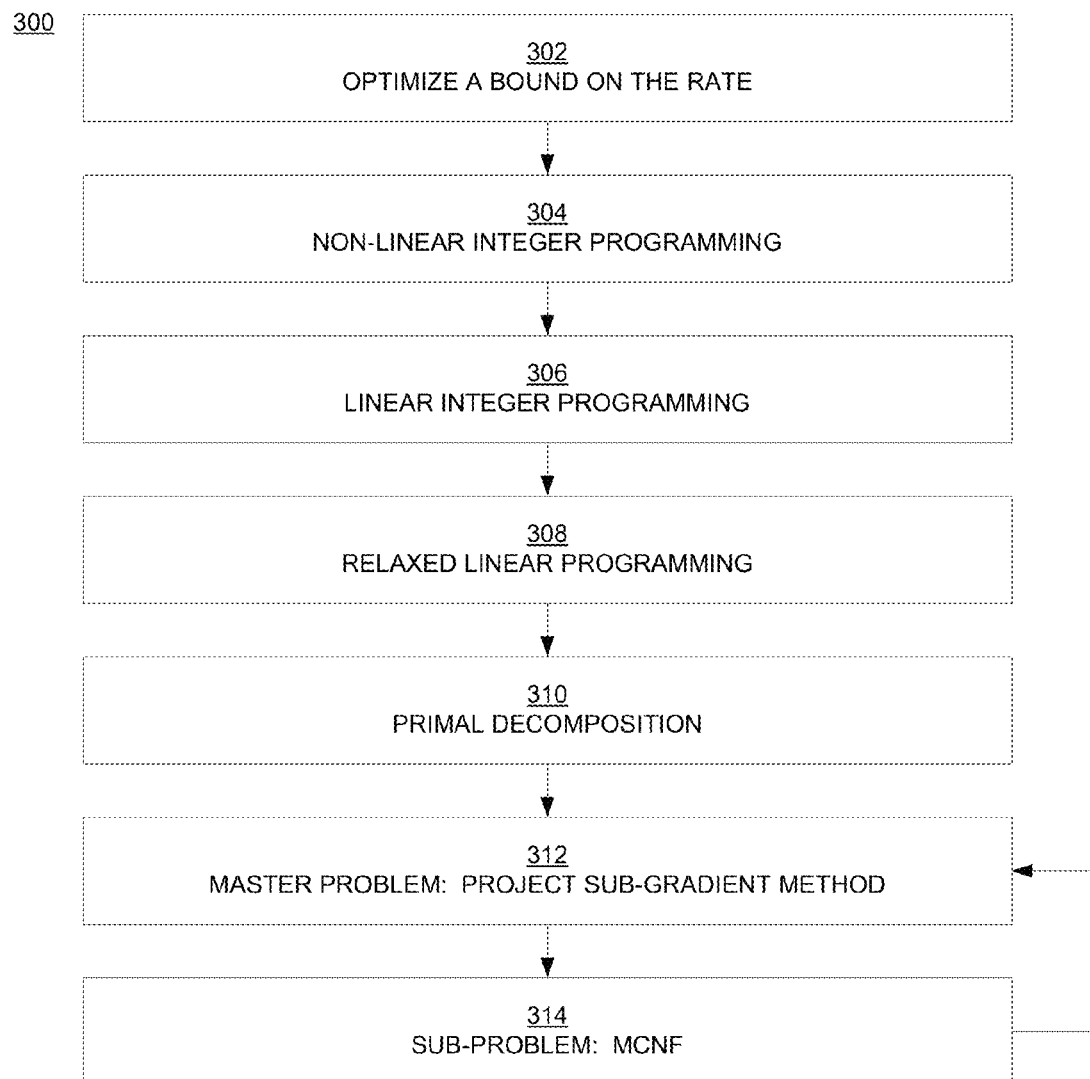
FIG. 3 is a flowchart of an example of a method for generating an ICIC model according to embodiments of the present disclosure.

FIG. 3 is a flowchart 300 of an example of a methodology that can be used to develop an ICIC model according to embodiments of the present disclosure. In overview, a bound on SINR and hence on the rate of a transmission link is introduced. The original optimization problem is transformed into a non-linear integer optimization problem based on the SINR bound. The non-linear integer optimization problem is transformed into an integer linear programming problem, which is transformed to a linear programming problem by relaxing the integer constraints in the integer linear programming problem. Solving the linear programming problem gives an upper bound solution for the integer linear programming problem. The linear programming problem is decomposed into a master problem and a number of sub-problems via dual decomposition. The linear programming problem is solved iteratively. The master problem is solved via a projected sub-gradient algorithm. Each of the sub-problems is transformed into a minimum cost network flow optimization problem (MCNF) for easier solution. The solution of the linear programming problem is converted into a solution feasible for the original problem.

In block 302, a bound that is a good metric for optimization is introduced. In block 304, the bound leads to a binary non-linear optimization problem that, in block 306, is transformed into an equivalent binary linear programming (BLP) problem. Next, in block 308, the resultant BLP problem is relaxed into a linear programming (LP) problem, discussed further below. Then, in block 310, a distributed algorithm is devised using primal-decomposition, also described further below. In blocks 312 and 314, a projected sub-gradient method is used with a MCNF-structured model. Blocks 312 and 314 are implemented using an iterative process in which information is shared amongst the base stations of FIG. 1 (e.g., in a distributed manner) and/or with a centralized node, as described further in conjunction with FIG. 4.

Bound Optimization (Block 302 of FIG. 3)

The SINR expression in equation (1) can be lower-bounded as:

$$\Gamma_{m,n}^k \geq \frac{P_c H_{m,n}^{k,k}}{P_C \sum_{\tilde{k}=1, \tilde{k} \neq k}^{K} H_{m,n}^{k,\tilde{k}} - \max_{\tilde{k} \in K^k} I_n^{\tilde{k}} P_c H_{m,n}^{k,\tilde{k}} + P_N}, \quad (5)$$

where $K^k$ is a set of indices of the six first-tier interfering sectors seen by sector k, e.g., with reference to FIG. 1, $K^3 = \{1, 2, 13, 17, 16, 20\}$. The bound in equation (5) is obtained by considering only the most dominant restricted-interferer. This bound is exact if the number of restricted interferers is less than or equal to one, and it is tight for a small number of restricted interferers. The bound of equation (5) has a number of benefits. First, it can be observed that if the bound is increased by $\Delta$, then the exact expression given by equation (1) will also increase by at least $\Delta$. Moreover, it is understood in the art that most of the gain can be obtained by restricting the use of a resource block to at most two sectors. Finally, and significantly, a distributed framework that is applicable to a wide range of schedulers and AMC strategies can be developed based on this bound. Such a framework can be implemented very efficiently, and can achieve near-optimal performance as calculated and measured by the model.

By substituting equation (5) into equation (2), $R_{m,n}^k$ can be bounded as:

$$R_{m,n}^k \geq r_{m,n}^k + \max_k I_n^{\tilde{k}} \tilde{r}_{m,n}^{k,\tilde{k}}, \text{ where} \quad (6)$$

$$r_{m,n}^k = f(\gamma_{m,n}^k), \tilde{r}_{m,n}^{k,\tilde{k}} = \begin{cases} f(\gamma_{m,n}^{k,\tilde{k}}) - r_{m,n}^k, & k \in K^k \\ 0, & k \notin K^k \end{cases}$$

$$\gamma_{m,n}^k = \frac{P_C H_{m,n}^{k,k}}{P_C \sum_{\tilde{k} \neq k} H_{m,n}^{k,\tilde{k}} + P_N}, \tilde{\gamma}_{m,n}^{k,\tilde{k}} = \frac{P_C H_{m,n}^{k,k}}{P_C \sum_{\tilde{k} \neq k} H_{m,n}^{k,\tilde{k}} - P_C H_{m,n}^{k,\tilde{k}} + P_N}.$$

Substituting equation (6) into equation (4a-c) yields:

$$\underset{x_{m,n}^k, I_n^k, \forall m,k}{\text{maximize}} \sum_{k=1}^{K} \sum_{m=1}^{M} \alpha_m^k x_{m,n}^k \left( r_{m,n}^K + \max_{\tilde{k}} I_n^{\tilde{k}} \tilde{r}_{m,n}^{k,\tilde{k}} \right) \quad (7a)$$

$$\text{subject to } \sum_{m=1}^{M} x_{m,n}^k = 1 - I_n^k, \forall k$$

$$x_{m,n}^k, I_n^k \in \{0, 1\}, \forall m, k. \quad (7b)$$

Equation (7a-b) is a non-linear binary integer optimization problem (block 304 of FIG. 3), which is generally difficult to solve. As a result, in block 306, equation (7) is converted into the following equivalent BLP problem:

$$\underset{\substack{x_{m,n}^k, y_{m,n}^{k,\tilde{k}}, I_n^k \\ \forall m,k, \forall \tilde{k} \in K^k}}{\text{maximize}} \sum_{k=1}^{K} \sum_{m=1}^{M} \alpha_m^k \left( x_{m,n}^k r_{m,n}^k + \sum_{\tilde{k}=1}^{K} y_{m,n}^{k,\tilde{k}} \tilde{r}_{m,n}^{k,\tilde{k}} \right) \quad (8a)$$

$$\text{subject to: } \sum_{m=1}^{M} x_{m,n}^k = 1 - I_n^k, \forall k$$

$$\sum_{\tilde{k} \in K^k} y_{m,n}^{k,\tilde{k}} \leq x_{m,n}^k, \forall m, k \quad (8b)$$

$$\sum_{m=1}^{M} y_{m,n}^{k,\tilde{k}} \leq I_n^{\tilde{k}}, \forall k, \tilde{k} \quad (8c)$$

$$x_{m,n}^k, y_{m,n}^{k,\tilde{k}}, I_n^k \in \{0, 1\}, \forall m, k, \tilde{k}, \quad (8d)$$

where $y_{m,n}^{k,\tilde{k}}$ are introduced as auxiliary variables. While equation (8a-d) can be solved using branch and bound, it is complex and its complexity may grow exponentially in a worst case scenario.

Linear Programming Relaxation (Block 308 of FIG. 3)

An upper bound on the solution of equation (8a-d) can be obtained by relaxing the binary constraints and using real numbers instead of integer or binary valued numbers, and solving the problem as an LP problem. This can be done by replacing equation (8d) with the following constraint:

$$x_{m,n}^k, y_{m,n}^{k,\tilde{k}}, I_n^k \in [0,1], \forall m, k, \tilde{k}. \quad (9)$$

Let $p^*_{BLP}$ denote the optimal value of equation (4a-c), let $p^*_{LP}$ denote the optimal value of the relaxed version of equation (8a-d), and let $\hat{p}^*_{LP}$ denote the value of the objective function evaluated at the rounded-solution (binary) of the relaxed problem. Consequently:

$$p^*_{LP} \geq p^*_{BLP} \geq \hat{p}^*_{LP}. \quad (10)$$

The optimality gap, $\Delta_{Opt}$, can be defined as a percentage as follows:

$$\Delta_{Opt} = \frac{p^*_{BLP} - \hat{p}^*_{LP}}{p^*_{BLP}} \times 100\% \leq \frac{p^*_{LP} - \hat{p}^*_{LP}}{p^*_{LP}} \times 100\%, \quad (11)$$

where the inequality follows from equation (10). By solving the relaxed problem and rounding the solution to the closest binary value, a solution that is near-optimal (e.g., with small $\Delta_{Opt}$) can be obtained. However, solving the relaxed problem in that manner relies on a centralized controller that is connected to all the base stations to solve a large LP and, as noted above, future standards may not support the use of a centralized controller. Embodiments according to the present disclosure remedy this by providing a distributed optimization method in the ICIC model to solve the relaxed version of problem equation (8a-d). However, an ICIC model according to the present disclosure can be implemented using a centralized controller. The distributed optimization method is presented below.

Primal Decomposition (Block 310 of FIG. 3)

The relaxed version of problem equation (8a-d) has a special structure. That is, for any set of fixed $I_k^n$, $\forall k$, the optimization problem can be separated into K optimization problems, and each of those sub-problems can be solved separately in each sector. In other words, the variables $I_k^n$, $\forall k$ are coupling (complicating) variables.

Let $\phi^k(I_n^1, \ldots, I_n^K)$ denote the optimal value of the following optimization problem (for fixed $\{I_n^1, \ldots, I_n^K\}$). Then:

$$\underset{\substack{x_{m,n}^k, y_{m,n}^{k,\tilde{k}} \\ \forall m, \forall \tilde{k} \in K^k}}{\text{maximize}} \sum_{k=1}^{K} \alpha_m^k \left( x_{m,n}^k r_{m,n}^k + \sum_{\tilde{k}=1}^{K} y_{m,n}^{k,\tilde{k}} \tilde{r}_{m,n}^{k,\tilde{k}} \right) \quad (12a)$$

$$\text{subject to:} \sum_{m=1}^{M} x_{m,n}^k = 1 - I_n^k \quad (12b)$$

$$\sum_{\tilde{k}=1}^{K} y_{m,n}^{k,\tilde{k}} \leq x_{m,n}^k, \forall m \quad (12c)$$

$$\sum_{m=1}^{M} y_{m,n}^{k,\tilde{k}} \leq I_n^{\tilde{k}}, \forall \tilde{k} \quad (12d)$$

$$x_{m,n}^k, y_{m,n}^{k,\tilde{k}} \in \{0,1\}, \forall m, \forall \tilde{k}, \quad (12e)$$

The sub-problem given by equation (12a-e) has a special structure—it can be transformed into an equivalent minimum cost network flow (MCNF) optimization problem. Converting equation (12a-e) into an MCNF results in significantly reduced computational complexity because MCNF optimization problems are well-studied and very efficient methodologies exist to solve them in strongly polynomial time. Those methodologies perform much faster than a generic LP solver. Consequently, equation (12a-e) can be efficiently solved.

Equation (12a-e) can be referred to as sub-problem k. Then, the relaxed version of equation (8a-d) is equivalent to:

$$\underset{, I_n^k, \forall k}{\text{maximize}} \sum_{k=1}^{K} \phi^k(I_n^1, \ldots, I_n^K) \quad (13a)$$

$$I_n^k \in [0,1], \forall k. \quad (13b)$$

Equation (13a-b) can be referred to as the master problem. Thus, the original problem has been decomposed into a master problem and K sub-problems using a primal-decomposition method.

The master problem can be solved iteratively using a projected sub-gradient method. In each iteration, K sub-problems are solved in order to evaluate $\phi(I_n^1, \ldots, I_n^K)$, $\forall k$ and a sub-gradient:

$$[\Lambda_n^{*1}, \ldots, \Lambda_n^{*K}] \in \partial \sum_{k=1}^{K} \phi^k(I_n^1, \ldots, I_n^K), \quad (14)$$

where $\partial f(x)$ is the subdifferential of $f(\bullet)$ evaluated at x. $\Lambda_n^{*k}$ is calculated as:

$$\Lambda_n^{*k} := -\lambda_n^{*k} + \sum_{\tilde{k} \in K^k} \lambda_n^{*\tilde{k},k}, \quad (15)$$

where $\Lambda_n^{*k}$ is an optimum Lagrange multiplier (dual variable) corresponding to constraint (12b), and $\lambda_n^{*k,\tilde{k}}, \tilde{k} \in K^k$ are optimum Lagrange multipliers (dual variables) corresponding to constraints (12d). In order for each sector k to calculate $\Lambda_n^{*k}$, the sector obtains $\Lambda_n^{*k}$ (which can be obtained locally at the base station in sector k by solving equation (12a-e)) and $\lambda_n^{*k,\tilde{k}}, \tilde{k} \in K^k$ (which can be received from the neighboring sectors). In other words, each sector k sends $\lambda_n^{*k,\tilde{k}}$ for all $\tilde{k}$ sectors that are in the neighborhood of sector k, for all n. The variables can then be updated according to the following:

$$I_n^k := I_n^k + \partial \Lambda_n^{*k}, \forall k, \quad (16)$$

where $\partial$ is the step size, which can be chosen using any of a variety of methods. Then, each $I_n^k$ is projected into the feasible set of [0,1] as follows:

$$I_n^k := \begin{cases} 0, & I_n^k \leq 0 \\ I_n^k, & 0 < I_n^k < 1 \\ 1, & I_n^k \geq 1 \end{cases} \quad (17)$$

Then, each sector k exchanges $I_n^k$ with its neighbors and the process is repeated for some number of iterations $N_{iter}$. Finally, in one embodiment, each $I_n^k$ is rounded to its nearest binary value:

$$I_n^k := \lfloor I_n^k + 0.5 \rfloor. \quad (18)$$

In this embodiment, a resource block is available/turned on when the power level variable I for that resource block has a value of 0, and a resource block is not available/turned off when the power level variable I for that resource block has a value of 1.

In one embodiment, the scheduling decision variables $x_{m,n}^k$ (first presented in conjunction with equation (3a-c) above) can then be calculated as follows:

$$x_{m,n}^{*k} = \begin{cases} 1, & m = \underset{m}{\text{argmax}} \, \alpha_m^k R_{m,n}^k \text{ and } I_n^{*k} = 0, \\ 0, & m \neq \underset{m}{\text{argmax}} \, \alpha_m^k R_{m,n}^k \text{ or } I_n^{*k} = 1. \end{cases} \quad (19)$$

That is, when $x_{m,n}^k = 1$ (which means $I_n^k = 0$ and hence the resource block n is turned on/available), then resource block n is allocated to user terminal m in sector k; and when $x_{m,n}^k = 0$ (which means $I_n^k = 0$ and hence the resource block n is turned on/available), then resource block n is not allocated to user terminal m in sector k.

The process just described (the process described by equations (12) through (17)) will converge to the optimum solution when $N_{iter}$ goes to ∞ if $\partial$ is chosen properly. In practice, however, a reasonable number of iterations are specified. In one embodiment, five iterations are performed.

Method of Model Implementation

Figure 4:
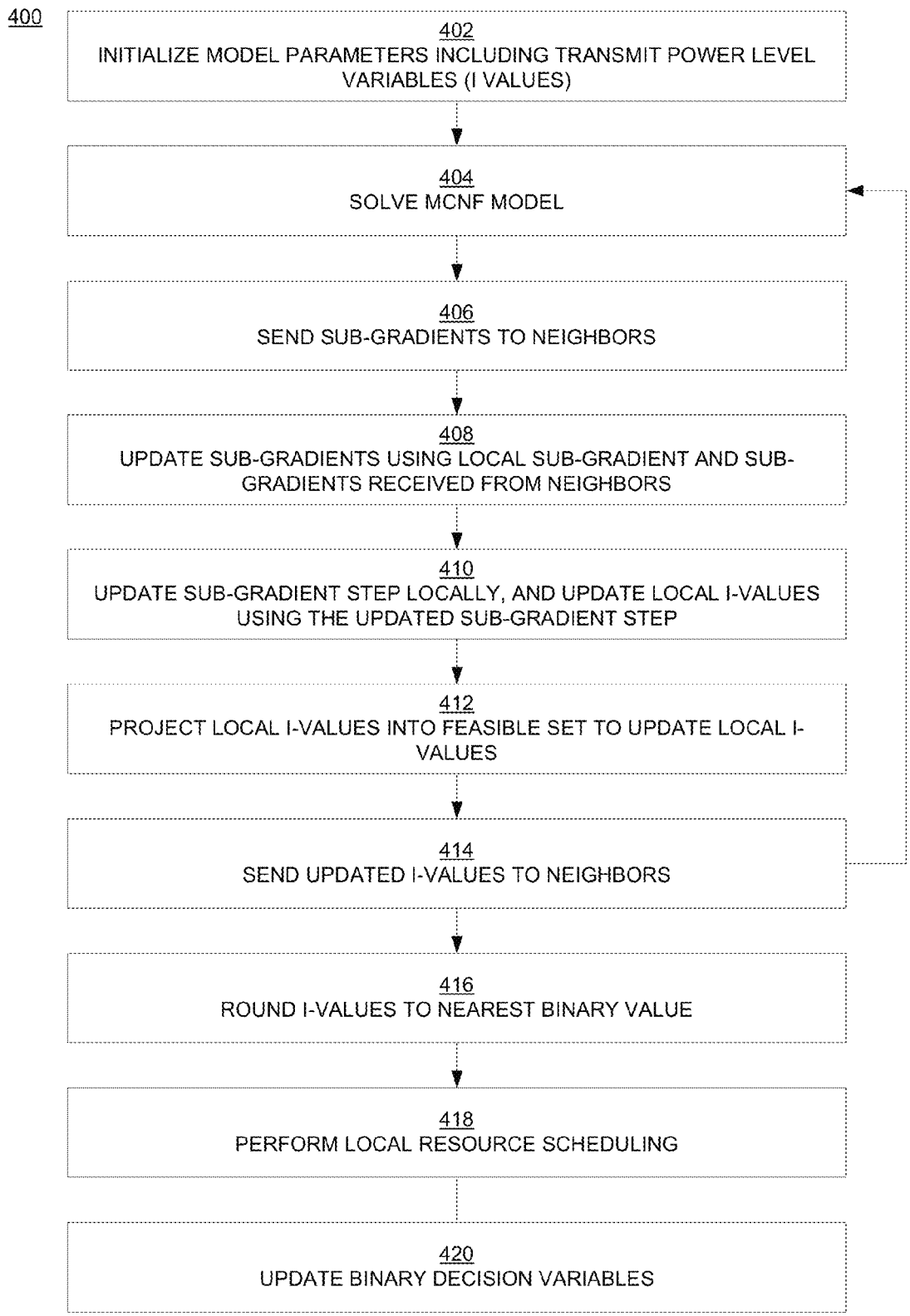
FIG. 4 is a flowchart of an example of a computer-implemented method for implementing an ICIC model in a wireless network according to embodiments of the present disclosure.

FIG. 4 is a flowchart 400 of an embodiment of a computer-implemented method for implementing an ICIC model according to embodiments of the present disclosure. Flowchart 400 can be implemented as computer-executable instructions residing on some form of computer-readable storage medium (e.g., in the memory 205 of the base station 200 of FIG. 2) that are executed by some form of processor (e.g., processor 204 of FIG. 2). As described above and below, certain information is exchanged between the base stations in neighboring sectors. Thus, the method of flowchart 400 can be similarly implemented on each of those base stations. Alternatively, the method of flowchart 400 can be implemented in a centralized location (which may be one of the base stations), in which case each base station exchanges information with the centralized location. Generally speaking, the method of flowchart 400 can be implemented using a communications controller, where that communications controller is implemented on each of the base stations or where that communications controller is implemented on a centralized node that is in communication with each of the base stations (the centralized node may be one of the base stations).

Figure 5A:
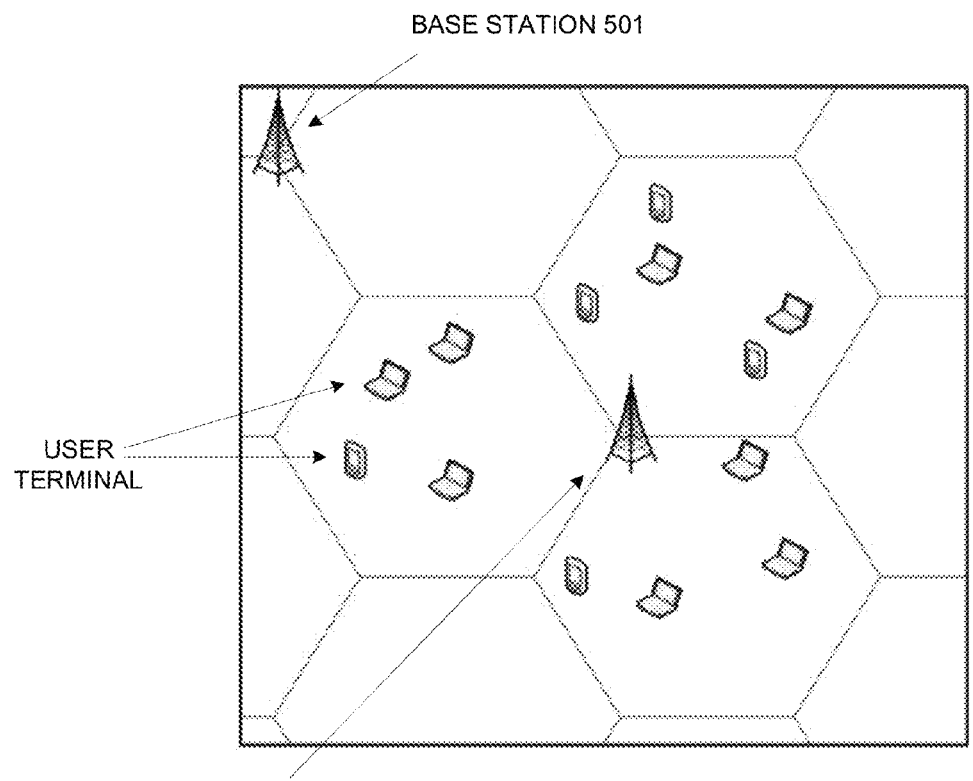
FIGS. 5A, 5B, and 5C illustrate an exchange of information between base stations according to embodiments of the present disclosure.
Figure 5B:
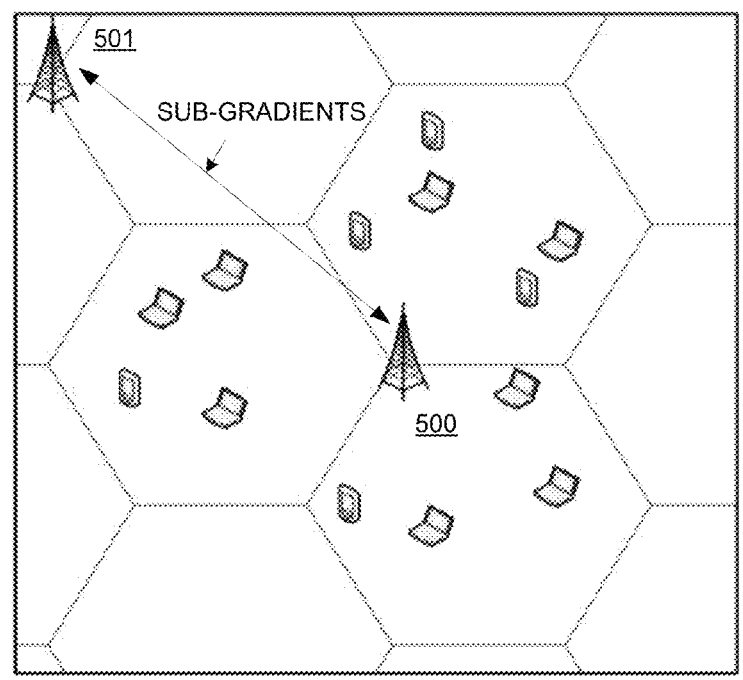
Figure 5C:
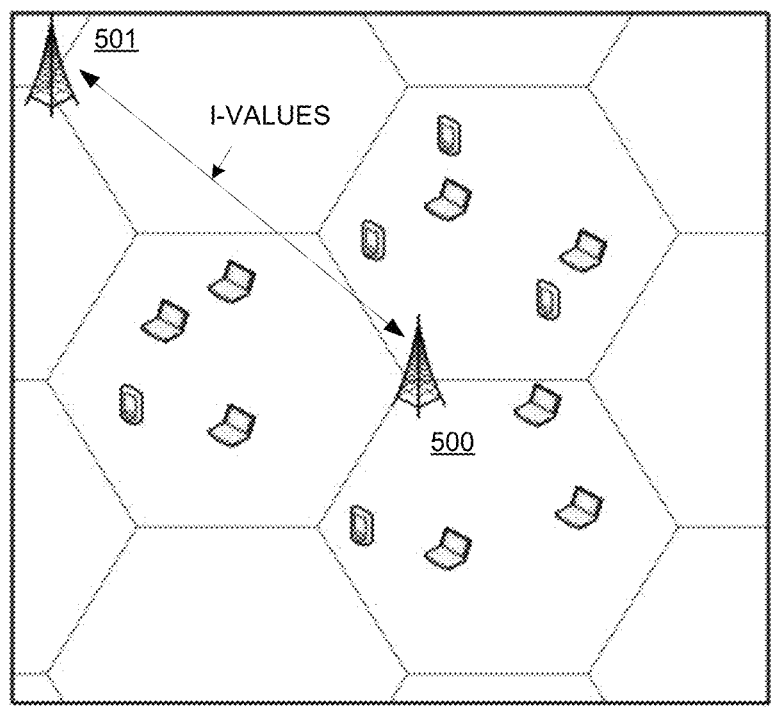

FIG. 4 is discussed in combination with FIGS. 5A, 5B, and 5C. FIGS. 5A-5C show a portion of a wireless network (analogous to the network 100 of FIG. 1) in which an ICIC model according to embodiments of the present disclosure is implemented in a distributed manner. In particular, FIGS. 5A-5C show a base station 500 and a base station 501 (only two base stations are shown for simplicity; however, embodiments according to the present disclosure are not so limited).

In block 402 of FIG. 4, ICIC model parameters are initialized on each of the base stations 500 and 501 (FIG. 5A). In particular, $I_n^k$, $\forall n, k$ are initialized.

As mentioned above, an iterative process is utilized to obtain final values that are applied in operation. Each cycle of the iterative process includes blocks 404, 406, 408, 410, 412, and 414 (blocks 404-414) of FIG. 4.

In block 404, the ICIC model (equation 12(a-e) converted into an MCNF) is solved to calculate $x^*{}_{m,n}^k$, $y^*{}_{m,n}^{k,\tilde{k}}$, $\lambda^*{}_n^k$ and the sub-gradients $\lambda^*{}_n^{k,\tilde{k}}$, $\forall \tilde{k} \in K^k$, $\forall n$. Generally speaking, the sub-gradients correspond to the effect of transmit power level for a resource block n on a measure of utility for the sector k. In one embodiment, the measure of utility is the weighted sum data transmission rate of all user terminals in the sector k. A sub-gradient is determined for each resource block n and, therefore, the amount of increase or decrease in the power decision variables $I_n^k$ can be different from resource block to resource block and from sector to sector, in contrast to conventional approaches in which the amount of increase or decrease is fixed across all resource blocks.

In block 406, the sub-gradients $\lambda^*{}_n^{k,\tilde{k}}$ are sent to the neighboring sectors $\tilde{k} \in K^k$, $\forall n$. In the example of FIG. 5B, the sub-gradients are exchanged between the base stations 500 and 501 and other base stations (not shown).

In block 408 of FIG. 4, each base station updates its sub-gradients according to the ICIC model by combining (adding) its sub-gradients with the sub-gradients received from the other base stations; specifically, $$\Lambda_n^{*k} := -\lambda_n^{*k} + \sum_{\tilde{k} \in K^k} \lambda_n^{*\tilde{k},k}. \quad \text{(equation (15))}$$

In block 410, each base station updates the sub-gradient step according to the ICIC model. Then, each base station updates its transmit power level variables $I_n^k$ according to the ICIC model; specifically, $I_n^k := I_n^k + \delta \Lambda^*{}_n^k$ (equation (16)).

In block 412, each $I_n^k$ is projected into the feasible set according to equation (17) of the ICIC model.

In block 414, the updated values $I_n^k$ are sent to the neighboring sectors $\tilde{k} \in K^k$, $\forall n$. In the example of FIG. 5C, the updated values $I_n^k$ are exchanged between the base stations 500 and 501 and other base stations (not shown).

As noted above, the blocks 404-414 constitute an iterative process that is repeated for some number of cycles $N_{iter}$. In one embodiment, once the iterative process is completed, in block 416, the values $I_n^k$ are rounded to the nearest binary value according to equation (18).

In block 418, local resource scheduling is performed. For example, the transmission rate per resource block per base station per sector can be calculated according to equations (1) and (2) and $I^*{}_n^k$.

In block 420, the decision variables $x_{m,n}^k$ are updated according to equation (19), where if $x_{m,n}^k=1$ then resource block n is allocated to user terminal m in sector k, and $x_{m,n}^k=0$ otherwise, in which case resource block n is not allocated to user terminal m in sector k.

In one embodiment, instead of applying the model to all resources blocks, it is applied to some fraction of the resource blocks to reduce complexity, and the remaining fraction of the resource blocks assume either a high power level (e.g., $I_n^k=0$; on) or a low power level (e.g., $I_n^k=1$; off).

The methodology described by the flowchart 400 has the following intuitive interpretation. If, according to the ICIC model, the benefit (measured by $$\left(\text{measured by } \sum_{\tilde{k} \in K^k} \lambda_n^{*\tilde{k},k}\right)$$

from shutting off power on a resource block n in sector k to neighboring sectors is more than the benefit ($\lambda^*{}_n^k$) of using resource block n in sector k, then the soft decision on $I_n^k$ is increased, and possibly $I_n^k$ is set to 1 (turn off resource block n in sector k). Note that, during the iterations, it is possible that $I_n^k$ can have real values between 0 and 1. On the other hand, if, according to the ICIC model, the benefit from shutting off power on resource block n in sector k to neighboring sectors is less than the benefit of using resource block n in sector k, then the soft decision on $I_n^k$ is decreased and possibly $I_n^k$ is set to 0 (turn on resource block n in sector k).

In the example of FIG. 4, the ICIC model is implemented such that the final values of $I_n^k$ are set to either 0 or 1 (that is, there are two power levels: on and off). However, embodiments of the disclosure are not limited to two power levels. As mentioned above, $I_n^k$ can have values between 0 and 1 and as such, in one embodiment, $I_n^k$ can be mapped to more than two power levels.

Implementation Approaches

As mentioned above, an ICIC model according to embodiments of the present disclosure can be implemented using a distributed approach or a centralized approach. Various implementations of these approaches are presented below.

Distributed Implementation

Figure 6:
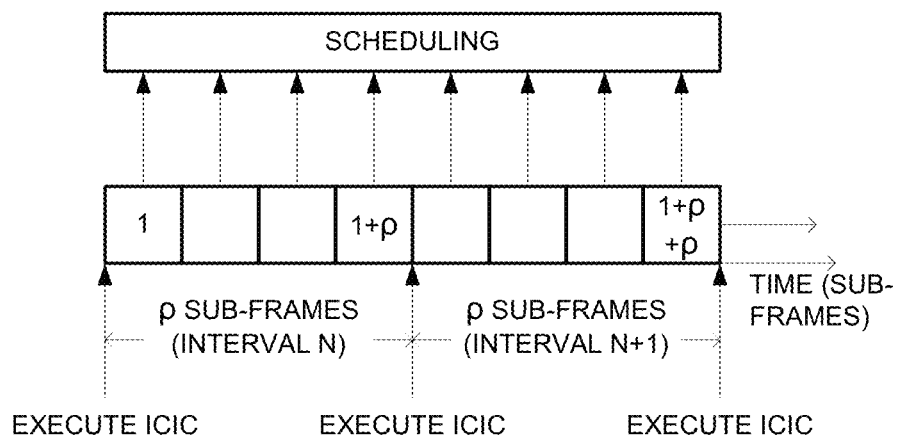
FIGS. 6 and 7 illustrate approaches for implementing an ICIC model according to embodiments of the present disclosure.

With reference to FIG. 6, an approach referred to herein as an adaptive approach is described. In this approach, each base station runs the ICIC model (e.g., performs the operations described by FIG. 4) and implements power and scheduling decisions at specified intervals as measured in number of subframes or TTIs. For example, execution of the ICIC model may take ρ subframes or TTIs to complete (including the exchange of information between base stations), and so the ICIC model is initalized at the beginning of an interval (e.g., at sub-frame 1) and completes execution at sub-frame 1+ρ. Accordingly, power/scheduling/rate decisions are made at the end of the interval N based on the calculated values of $I_n^k$ and $x_{m,n}^k$, and are applied starting at sub-frame 1+ρ over the next interval N+1 (which starts at sub-frame 1+ρ and ends at sub-frame 1+ρ+ρ), and so on. Channel information could be filtered to represent the average channel information for the next calculation.

Figure 7:
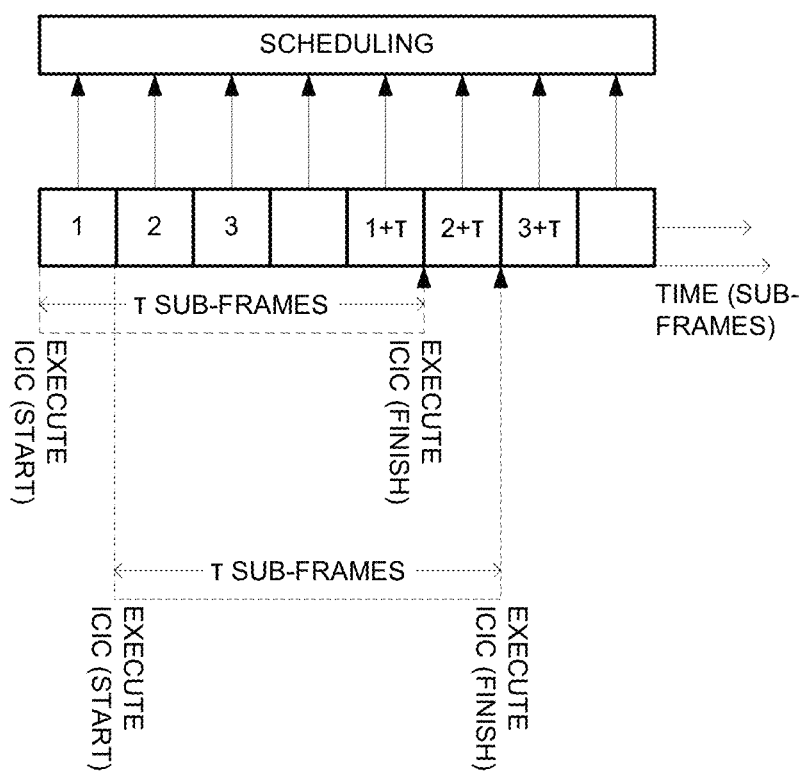

With reference to FIG. 7, an approach referred to herein as a dynamic approach is described. In the dynamic approach, the ICIC model is essentially run in a parallel or pipelined fashion for each interval of τ sub-frames or TTIs. For example, execution of the ICIC model (e.g., the operations described by FIG. 4) may take τ subframes or TTIs to complete (including the exchange of information between base stations), and so the ICIC model is initalized at the beginning of an interval (e.g., at sub-frame 1), and completes execution at sub-frame 1+τ. Based on those results, power/scheduling/rate decisions are made and applied during sub-frame 2+τ. In parallel with the first calculation, the ICIC model is initialized and executed beginning at sub-frame 2, and completes execution at sub-frame 2+τ. Based on the results from the parallel calculation, power/scheduling/rate decisions are made based on the calculated values of $I_n^k$ and $x_{m,n}^k$ and applied during sub-frame 3+τ, and so on. Thus, in the dynamic approach, results can be implemented in each TTI.

The approaches described above can be utilized in an Almost Blank Subframe (ABS) scheme. That is, the adaptive and dynamic approaches can be utilized to for ABS scheduling decisions.

The ICIC model can be implemented at regular time intervals or at scheduled times, in which case the channel information is to be averaged to match the time between starts. Alternatively, the ICIC model can be implemented whenever channel, loading, or traffic conditions, for example, change by a threshold amount.

Centralized Implementation

As an alternative to the distributed implementations just described, a centralized node can be tasked with obtaining the channel information and throughput information from the various base stations. The centralized node can then run the ICIC model until a specified level of convergence is reached, and then can send to each base station the calculated values of I that are to be used by that base station. The channel information can be filtered to represent the average channel information for the next interval of sub-frames or TTIs.

Method

Figure 8:
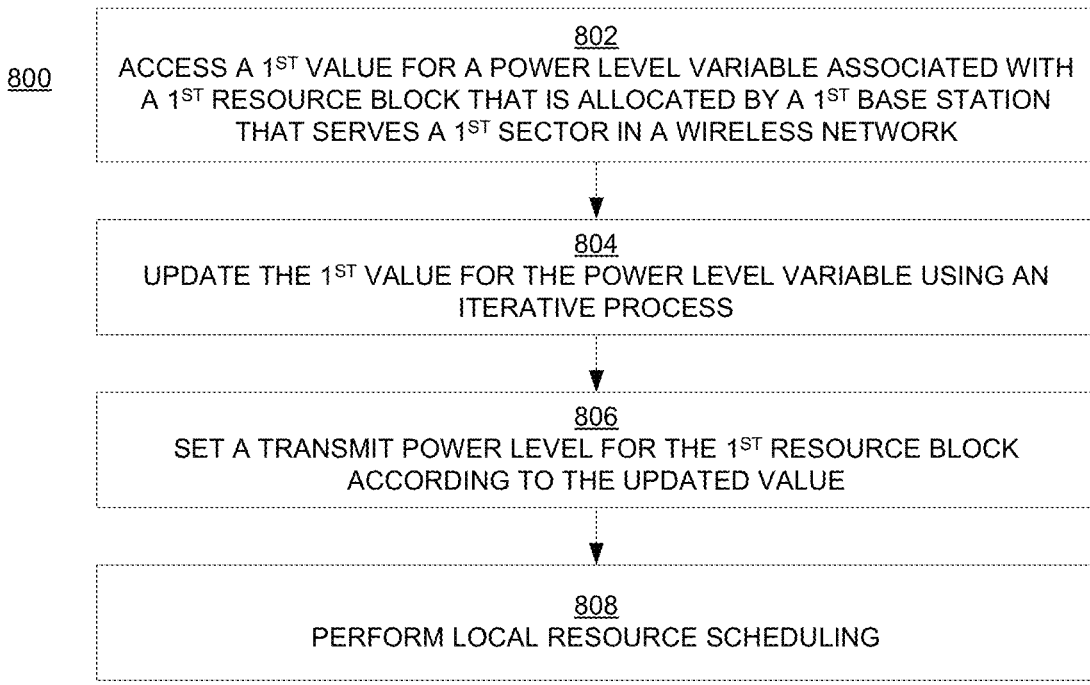
FIG. 8 is a flowchart of an example of a computer-implemented method for implementing an ICIC model according to embodiments of the present disclosure.

FIG. 8 is a flowchart 800 of an example of a computer-implemented process for implementing embodiments of the ICIC model described above. Flowchart 800 can be implemented as computer-executable instructions residing on some form of computer-readable storage medium (e.g., in the memory 205 of the base station 200 of FIG. 2) that are executed by some form of processor (e.g., processor 204 of FIG. 2). As described above and below, certain information is exchanged between the base stations in neighboring sectors. Thus, the method of flowchart 800 can be implemented on each of those base stations. Alternatively, the method of flowchart 800 can be implemented in a centralized location (which may be one of the base stations), in which case each base station exchanges information with the centralized location. Generally speaking, the method of flowchart 800 can be implemented using a communications controller, where that communications controller is implemented on each of the base stations or where that communications controller is implemented on a centralized node that is in communication with each of the base stations (the centralized node may be one of the base stations).

Flowchart 800 is described from the perspective of a single base station (that is in communication with other base stations) and in the context of a single resource block. The discussion of flowchart 800 can be readily extended to other base stations; that is, the operations described below are essentially being duplicated on the other base stations. Also, the discussion below can be readily extended to each resource block of each base station.

In block 802, the communications controller accesses a first value for a power level variable (e.g., an I value) associated with a first resource block that is allocated by a first base station that serves a first sector of the wireless network.

In block 804, the communications controller updates the first value for the power level variable according to an iterative process that is performed for a prescribed number of cycles. The iterative process includes: i) receiving a second value from a second base station that serves a second sector of the wireless network, the second value corresponding to the effect of power level for a second resource block allocated by the second base station on a measure of utility for the second sector; and ii) determining an updated value for the power level variable according to the second value. In one embodiment, the second value is a sub-gradient value calculated for the second resource block using an MCNF-structured model. In one embodiment, the measure of utility is a weighted sum data transmission rate of all user terminals in the first sector.

In one embodiment, the iterative process also includes accessing a third value corresponding to the effect of the transmit power level for the first resource block on a measure of utility for the first sector, where the third value is determined according to the first value; and determining the updated value for the power level variable according to the sum of the second and third values. In one such embodiment, the third value is a sub-gradient value calculated for the first resource block using the MCNF-structured model. In another such embodiment, the third value is sent to the second base station.

In block 806, the communications controller sets a transmit power level for the first resource block according to the updated value. In one embodiment, the updated value is rounded to the nearest binary value, in which case the first resource block is turned on (is available for allocation) if the updated value has a first binary value and turned off (is not available for allocation) if the updated value has a second binary value In block 808, local resource scheduling is performed. For example, the first resource block can be allocated to a user terminal in the first sector according to the updated value. For example, the selected transmit power level can be used to determine a data transmission rate for the first resource block.

Local resource scheduling can be performed per sub-frame/per TTI (for example, using the adaptive approach described above in conjunction with FIG. 6) or it can be performed for an interval of multiple sub-frames/TTIs (for example, using the dynamic approach described above in conjunction with FIG. 7).

Simulation Results

Simulation One

I. Simulation Setup and Parameters

Four International Mobile Telecommunications-Advanced (IMT-Advanced) scenarios, namely, Urban Micro (UMi), Urban Macro (UMa), Rural Macro (RMa), and Suburban Macro (SMa), are simulated. Table 1 summarizes the simulation parameters used for all scenarios, and Table 2 shows the scenario-specific parameters. Perfect channel estimation is assumed. Each user terminal is associated with the base station to which it has the highest average received power (excluding shadowing).

TABLE 1

Common Simulation Parameters Used in all Scenarios

| Parameter | Assumption or Value |
|---|---|
| Cellular layout | 57 hexagonal sectors (wraparound) |
| Number of user terminals per sector | from 2 to 30 |
| Bandwidth (downlink) | 10 MHz |
| Number of resource blocks (N) | 50 |
| Small-scale fading model | IMT-Advanced channel model |
| Base station antenna gain (boresight) | 17 dBi |
| User terminal antenna gain | 0 dBi |
| Noise power per resource block ($P_N$) | −114.45 dBm (noise figure = 7 dB) |

TABLE 2

IMT-Advanced Scenario Specifications

| Scenario | UMi | UMa | RMa | SMa |
|---|---|---|---|---|
| Inter-site distance | 200 m | 500 m | 1732 m | 1299 m |
| Base station height | 10 m | 25 m | 35 m | 35 m |
| Min. dist. b/w user terminal and base station | 10 m | 25 m | 35 m | 35 m |
| Antenna tilt | −12° | −12° | −6° | −6° |
| Carrier frequency (GHz) | 2.5 | 2.0 | 0.8 | 2.0 |
| Total base station transmit power | 41 dBm | 46 dBm | 46 dBm | 46 dBm |
| Path loss and shadowing | NLOS | NLOS | NLOS | NLOS |

II. Simulation Results

In order to develop an efficient algorithm to solve the difficult binary integer linear program (BILP) in a distributed manner, two sources of sub-optimality were introduced, namely, relaxing the integer constraints and solving the master optimization problem in finite iterations. To understand the effect of theses sources of sub-optimality, the mean and standard deviation of the upper-bound on the optimality gap for different numbers of iterations are presented in Table 3. For each number of iterations, a total of 22,000 instances of the optimization problems for the four IMT-advanced scenarios and different numbers of user terminals are simulated. In the first subframe, a random initial point is used. In the subsequent subframes, the optimal solution of the previous frame is used as an initial point. It is clear from Table 3 that the simulated embodiment of the ICIC model converges very quickly to a near-optimum solution. As a result, for the rest of the simulations, the number of iterations are fixed to be 5, since it produces very small optimality gap.

TABLE 3

Mean and Standard Deviation of the Optimality Gap (%)

| Number of Iterations | Mean (%) | Standard Deviation (%) |
|---|---|---|
| 0 | 43.62 | 1.16 |
| 1 | 4.61 | 4.19 |
| 2 | 2.87 | 3.39 |
| 5 | 1.43 | 1.43 |
| 10 | 0.95 | 0.88 |

Figure 9:
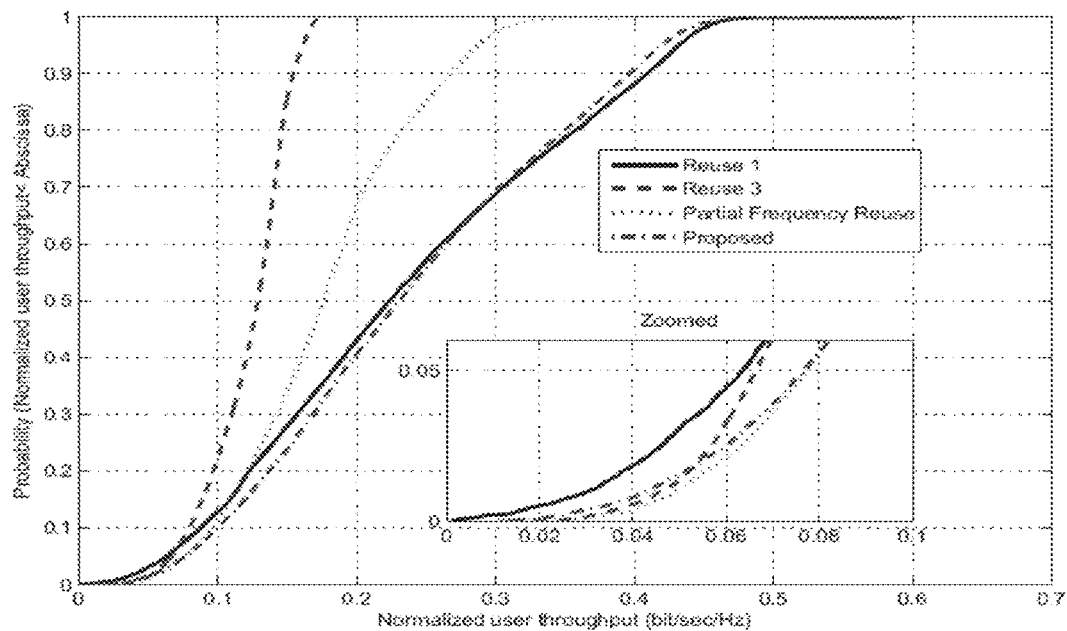
FIGS. 9 and 10 are plots of simulation results including results generated according to embodiments of an ICIC model according to the present disclosure.

In FIG. 9, the cumulative distribution function (CDF) of the normalized time-average user terminal throughput for four schemes: reuse 1, reuse 3, partial frequency reuse, and the ICIC model. Normalization is performed by dividing the user throughput over the total downlink bandwidth, which is 10 MHz. It is clear from the figure that reuse 1 has the worst cell-edge performance (0.066) as compared to the other three schemes, due to the excessive interference experienced at the cell-edge. Reuse 3, PFR, and the proposed scheme achieve normalized cell-edge user throughput of 0.067, 0.077, and 0.077, respectively. However, both reuse 3 and PFR improve the cell-edge performance at the expense of reducing the overall throughput, especially for user terminals close to the cell-center. For example, the 95th percentiles (which is an indication of the cell-center user terminals) achieved by reuse 3 and PFR are 0.16 and 0.29, respectively, as compared to 0.43 and 0.42 achieved by reuse 1 and the proposed scheme, respectively. Interestingly, the simulated embodiment of the ICIC model (identified as "proposed" in the figures and tables) combines the advantages of reuse 1, reuse 3, and PFR, as it provides very good cell-edge throughput and very good center-cell throughput simultaneously. The same trend has been observed from the CDF for UMi, RMa, and SMa scenarios.

Figure 10:
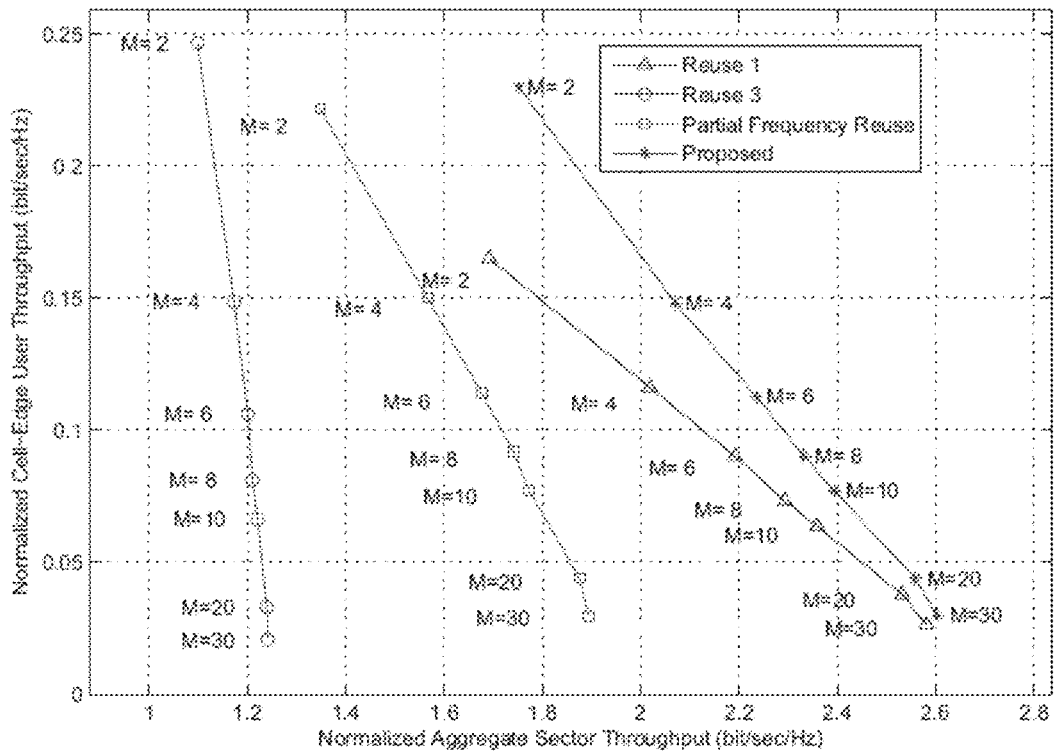

In order to take a closer look at the performance of the different schemes, the normalized cell-edge user throughput and the normalized aggregate sector throughput for all schemes and for different number of user terminals, for the UMa scenario, are shown in FIG. 10. The general trend for all schemes (as expected) is that as M increases, the sector throughput increases due to the increase in multi-user diversity achieved by the channel-aware scheduler (PFS in this case) and the cell-edge user throughput decreases because more user terminals share the same resources. For the same number of user terminals, we observe that reuse 3, PFR, and the proposed scheme have significantly higher cell-edge throughput than reuse 1, especially for smaller M. On the other hand, it is clear that both reuse 3 and PFR incur significant loss in the aggregate sector throughput. Interestingly, the simulated embodiment of the ICIC model performs very well in both the cell-edge and the sector throughput as compared to all other schemes.

In Table 4, the gains in aggregate sector throughput and cell-edge user throughput achieved by reuse 3, PFR, and the simulated embodiment of the ICIC model as compared to reuse 1 are summarized. These gains were obtained for the four IMT-Advanced scenarios described above. For each scenario, the number of user terminals per sector is varied from 2 to 30. It is clear that the ICIC model can achieve significant gain in the cell-edge throughput (e.g., a gain of 97% for RMa and M=2) without any penalty on the aggregate sector throughput. Contrarily, both reuse 3 and PFR incur significant loss in the aggregate sector throughput (e.g., a loss of about 40% and 25%, respectively).

TABLE 4

Gains (%) in Sector Throughput and Cell-Edge Throughput as Compared to Reuse 1

| Scenario | M | Aggregate Sector Throughput | | | Cell-Edge User Throughput | | |
|---|---|---|---|---|---|---|---|
| | | Reuse 3 | PFR | Proposed | Reuse 3 | PFR | Proposed |
| UMi | 2 | −35% | −19% | 3% | 33% | 31% | 27% |
| | 6 | −45% | −23% | 2% | 3% | 15% | 17% |
| | 10 | −48% | −25% | 1% | −8% | 11% | 13% |
| | 30 | −52% | −27% | 1% | −31% | −1% | 7% |
| UMa | 2 | −35% | −20% | 4% | 49% | 34% | 39% |
| | 6 | −45% | −24% | 2% | 18% | 26% | 25% |
| | 10 | −48% | −25% | 1% | 4% | 21% | 21% |
| | 30 | −52% | −27% | 1% | −22% | 12% | 14% |
| RMa | 2 | −35% | −20% | 3% | 119% | 98% | 97% |
| | 6 | −44% | −23% | 1% | 55% | 54% | 41% |
| | 10 | −47% | −24% | 1% | 29% | 41% | 30% |
| | 30 | −50% | −26% | 1% | 5% | 33% | 23% |
| SMa | 2 | −35% | −22% | 3% | 138% | 106% | 93% |
| | 6 | −44% | −24% | 1% | 47% | 45% | 35% |
| | 10 | −47% | −24% | 1% | 28% | 37% | 26% |
| | 30 | −50% | −26% | 1% | 2% | 31% | 21% |

Simulation Two

I. Simulation Setup and Parameters

Simulation parameters are based on the IMT-Advanced Urban Macro (UMa) scenario. Table 5 summarizes the simulation parameters.

TABLE 5

Common Simulation Parameters Used in All Scenarios

| Parameter | Assumption or Value |
|---|---|
| Cellular layout | 57 hexagonal sectors (wraparound) |
| Number of user terminals per sector | 10 |
| Inter-site distance | 500 m |
| Base station height | 25 m |
| Min. dist. b/w user terminal and base station | 25 m |
| Bandwidth (downlink) | 10 MHz |
| Number of resource blocks (N) | 50 |
| Small-scale fading model | IMT-Advanced channel model |
| base station antenna gain (boresight) | 17 dBi |
| user terminal antenna gain | 0 dBi |
| Horizontal and elevation base station ant. pattern | According to IMT-Advanced |
| Antenna tilt | −12° |
| Noise power per resource block ($P_N$) | −114.45 dBm (noise figure = 7 dB) |
| Channel estimation delay | 4 sub-frames |
| Carrier frequency (GHz) | 2.0 |
| Total base station transmit power | 46 dBm |
| Path loss and shadowing | According to IMT-Advanced |

II. Importance of Accurate Simulation

An element in the simulation that has important effect on assessing the performance of ICIC schemes is highlighted. The way user terminals are associated to base stations can have significant impact on the simulation results. In the following, three association strategies are described, namely, wideband SINR-based, wideband SINR-based (excluding shadowing), and geographical-based. Wideband SINR is defined as the ratio of the average power received from the serving base station to the sum of the average power received from all other base stations and the noise power at the user terminal (small scale fading is not included in the calculation of the wideband SINR). In wideband SINR-based association, user terminal is associated with the base station antenna to which it has the highest wideband SINR. This association strategy resembles reality, provides the most favorable results, and it is widely used by evaluation groups. A consequence of this strategy is that the base station coverage region of each sector changes from drop to drop due to the different shadowing realizations. Another consequence is that a user terminal may not be associated to the closet base station as it may experience heavy shadowing to that base station. A more convenient way of doing simulation is to exclude shadowing in the calculation of the wideband SINR which leads to fixed coverage regions for each sector in all drops. Due to the directional antenna patterns, the coverage regions of each sector is not hexagonal. In geographical-based association, user terminal is associated to a particular base station antenna if it resides inside the geographical hexagonal area served by that base station antenna. In this strategy, the coverage region of each sector is hexagonal.

Figure 11:
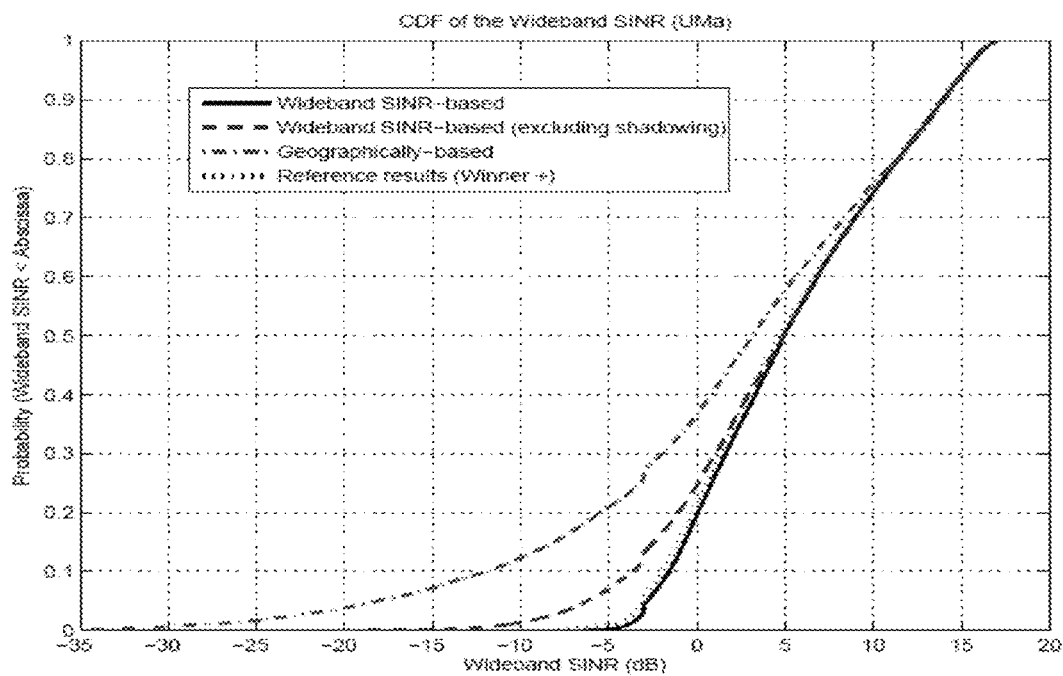
FIG. 11 is a plot showing SINR (signal to interference-plus-noise ratio) distributions.

In FIG. 11, the CDF of the wideband SINR using the three association strategies is plotted. The average CDF results produced by six WINNER+(Wireless World Initiative New Radio+) partners for calibration are included. It is clear from the figure that wideband SINR association strategy produces a CDF that agrees very well with the calibrated results; however, the other two association strategies produce a heavy tail which would impact the throughput of the users at the cell edge. The heavy tail is a direct consequence of associating user terminals in suboptimal manner. As shown below, these two association strategies may not be suitable for assessing the performance of ICIC schemes as they tend to exaggerate the gains achieved for user terminals at the cell-edge.

III. Simulation Results

In order to develop an efficient algorithm to solve the difficult optimization problem in a distributed manner, two sources of sub-optimality were introduced, namely, relaxing the integer constraints and solving the master optimization problem in finite iterations. To understand the effect of theses sources of sub-optimality, Table 6 presents the mean and standard deviation of the upper-bound on the optimality gap for different numbers of iterations. For each number of iterations, a total of 22,000 instances of the optimization problems for four IMT-advanced scenarios and different numbers of user terminals are simulated. In the first subframe, a random initial point is used. In the subsequent subframes, the optimal solution of the previous frame is used as an initial point. It is clear from Table 6 that the simulated embodiment of the ICIC model converges very quickly to a near-optimum solution. As a result, for the rest of the simulations, the number of iterations is set to 5, since it produces very small optimality gap.

The numbers in Table 6.a illustrate that the simulated embodiment of the ICIC model can solve the bound optimization in a near-optimum manner. A natural question to ask is how far is the optimal value obtained by solving the bound optimization as compared to the optimal value obtained by solving the original problem sing exhaustive search (which has prohibitive complexity). Due to the exponential computational complexity of exhaustive search, simulating a system of 57 sectors is not feasible. As a result, only the optimality gap for a system of 12 sectors is shown in Table 6.b. The simulated embodiment of the ICIC model can achieve, on average, about 96% of the optimum value achieved using exhaustive search, if it is executed once (5 iterations). One can also reduce the optimality gap further by executing the ICIC model more than once. That is, after finding the optimum $I_n^k$ in one run, the simulated embodiment of the ICIC model sets $H_{m,n}^{\tilde{k},k}=0$ if $I_n^k=1$, $\forall m,\tilde{k}$, and executes the ICIC model again. In this case, one can achieve about 97.6% of the optimum value achieved using exhaustive search, e.g., incremental gain, at the expense of more computational complexity. This shows that the bound optimization is indeed a good method to achieve near-optimality and shows that most of the gain is already captured by executing the algorithm once.

TABLE 6

Mean and Standard Deviation of the Optimality Gap (%)

| | Mean (%) | Standard Deviation (%) |
|---|---|---|
| a. compared to the optimal value of the bound optimization | | |
| Number of Iterations | | |
| 0 | 43.62 | 1.16 |
| 1 | 4.61 | 4.19 |
| 2 | 2.87 | 3.39 |
| 5 | 1.43 | 1.43 |
| 10 | 0.95 | 0.88 |
| b. compared to the optimal value of the original problem | | |
| Number of Runs | | |
| 1 | 3.8 | 1.7 |
| 2 | 2.4 | 0.8 |

In Table 7, the effect of the base station-user terminal association strategy on the aggregate sector throughput and cell-edge user throughput is illustrated. For wideband SINR-based (excluding shadowing) and geographically-based association strategies, the cell-edge user throughput for reuse 1 is very low and all ICIC schemes show tremendous gains as compared to reuse 1 (gain of 200% to ∞); however, these gains are artifacts of the heavy tail in the wideband SINR distribution (see FIG. 11) caused by associating user terminals to base stations in a suboptimal manner. This in turn makes any improvement in cell-edge user throughput to be large as compared to the very low values of reuse 1. As a result, a wideband SINR-based association strategy is used to assess the performance of the different ICIC schemes.

TABLE 7

The Effect of the Base Station-User Terminal Association Srategy on the Normalized Cell-Edge User Throughput for Different Schemes

| Association Strategy | Normalized Cell-edge User Throughput | | | |
|---|---|---|---|---|
| | Reuse 1 | Reuse 3 | PFR | Proposed |
| Geographically-based | 0 | 0.003 | 0.002 | 0.001 |
| Wideband SINR-based (excluding shadowing) | 0.008 | 0.019 | 0.019 | 0.016 |
| Wideband SINR-based | 0.021 | 0.026 | 0.028 | 0.027 |

Figure 12:
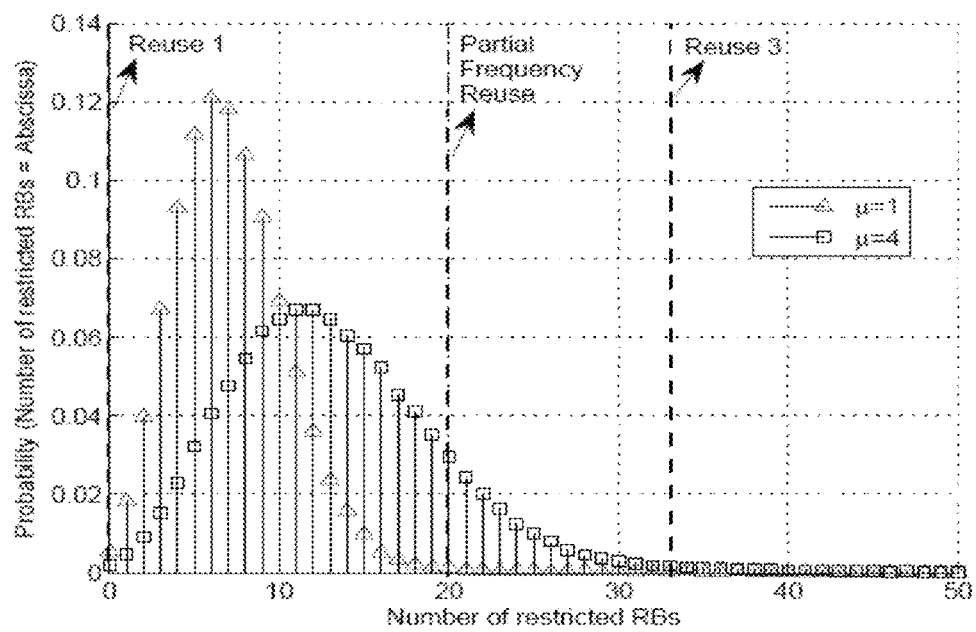
FIGS. 12, 13, 14, 15, 16, 17, 18, 19, and 20 are plots of simulation results including results generated according to embodiments of an ICIC model according to the present disclosure.

In FIG. 12, the probability mass function of the average number of restricted resource blocks per sector for different fairness levels is plotted. The simulated embodiment of the ICIC model has the flexibility to change the distribution of the restricted resources according to the desired fairness level. As $\mu$ increases, cell-edge users become more important and thus more resources need to be restricted and vice versa. The figure shows also that the proposed scheme acts as reuse 1 (no restrictions) and reuse 3 (two-thirds of resource blocks are restricted) with very small probabilities which suggests that reuse 1 and reuse 3 are far from optimum.

Figure 13:
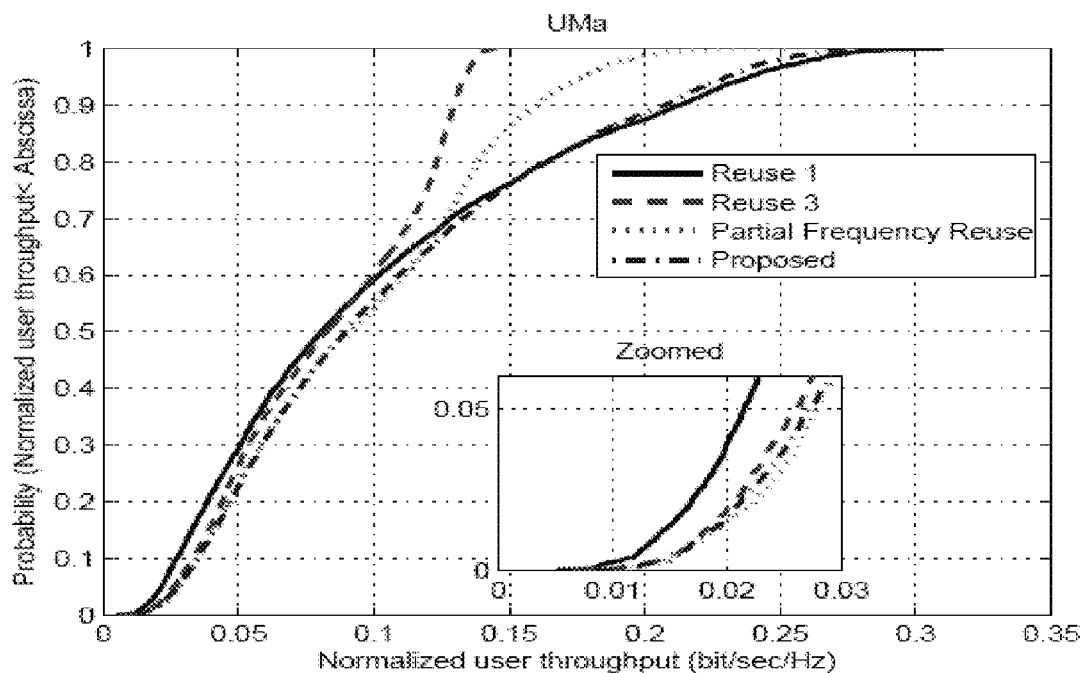
Figure 14:
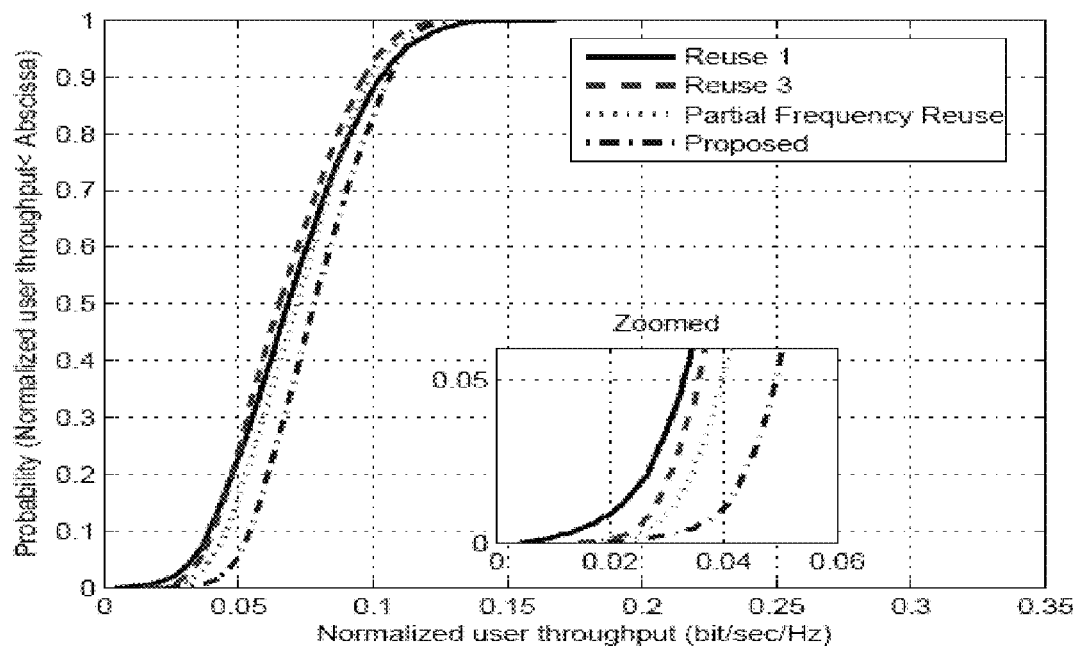
Figure 15:
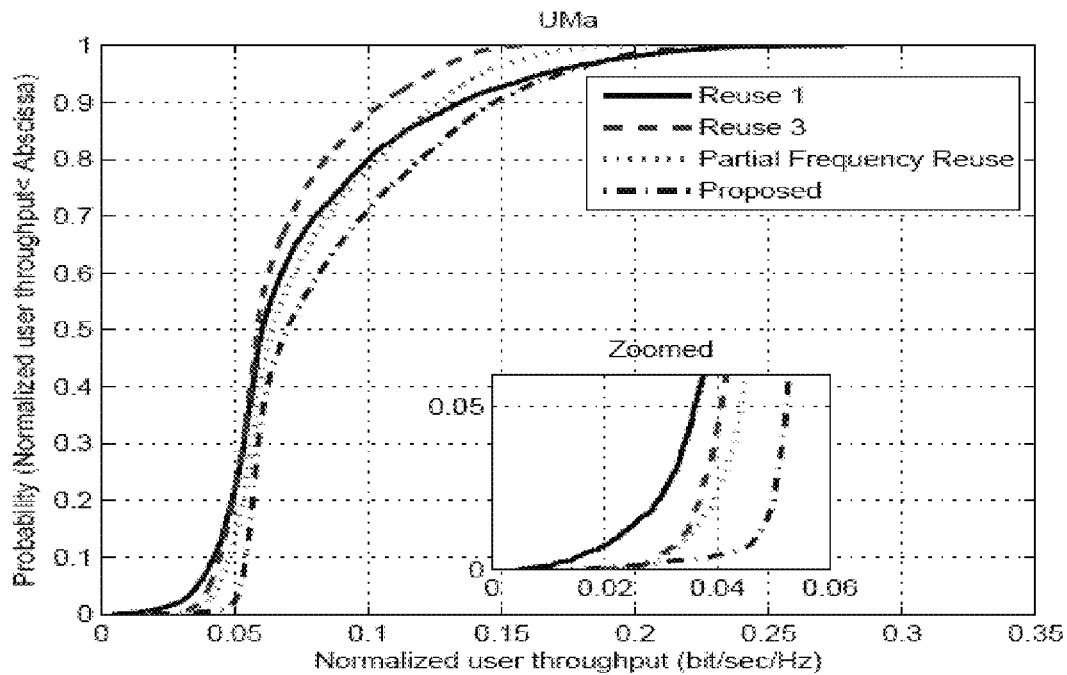

In FIG. 13, the CDF of the normalized time-average user terminal throughput is shown for four schemes: reuse 1, reuse 3, PFR, and the simulated embodiment of the ICIC model. Normalization is performed by dividing the user throughput over the total downlink bandwidth, which is 10 MHz. In all schemes, proportional fair scheduler is used. It is clear from the figure that reuse 1 has the worst cell-edge performance (0.021) as compared to the other three schemes, due to the excessive interference experienced at the cell-edge. Reuse 3, PFR, and the simulated embodiment of the ICIC model achieve normalized cell-edge user throughput of 0.026, 0.028, and 0.027, respectively. However, both reuse 3 and PFR improves the cell-edge performance at the expense of reducing the overall throughput, especially for user terminals close to the cell-center. For example, the 95th percentiles (which is an indication of the cell-center user terminals) achieved by reuse 3 and PFR are 0.134 and 0.174, respectively, as compared to 0.241 and 0.233 achieved by reuse 1 and the proposed scheme, respectively. Interestingly, the simulated embodiment of the ICIC model combines the advantages of reuse 1, reuse 3, and PFR, as it provides very good cell-edge throughput and very good center-cell throughput simultaneously. The CDF of the normalized time-average user terminal throughput for the four schemes is shown in FIG. 14 for a GPFS (Guaranteed Proportional Fairness Scheduling) with $\mu=4$. In this case, the gains achieved using the ICIC model in both cell-edge and cell-center throughput are more pronounced. The CDF of the normalized time-average user terminal throughput for the four schemes in FIG. 15 for a proportional fair scheduler (GPFS with $\mu=1$ and with a minimum average rate guarantee $R_{min}$ of 0.05. Again, the gains in both cell-edge and cell-center throughput are more pronounced than the case with no minimum average rate guarantee ($R_{min}=0$).

Figure 16:
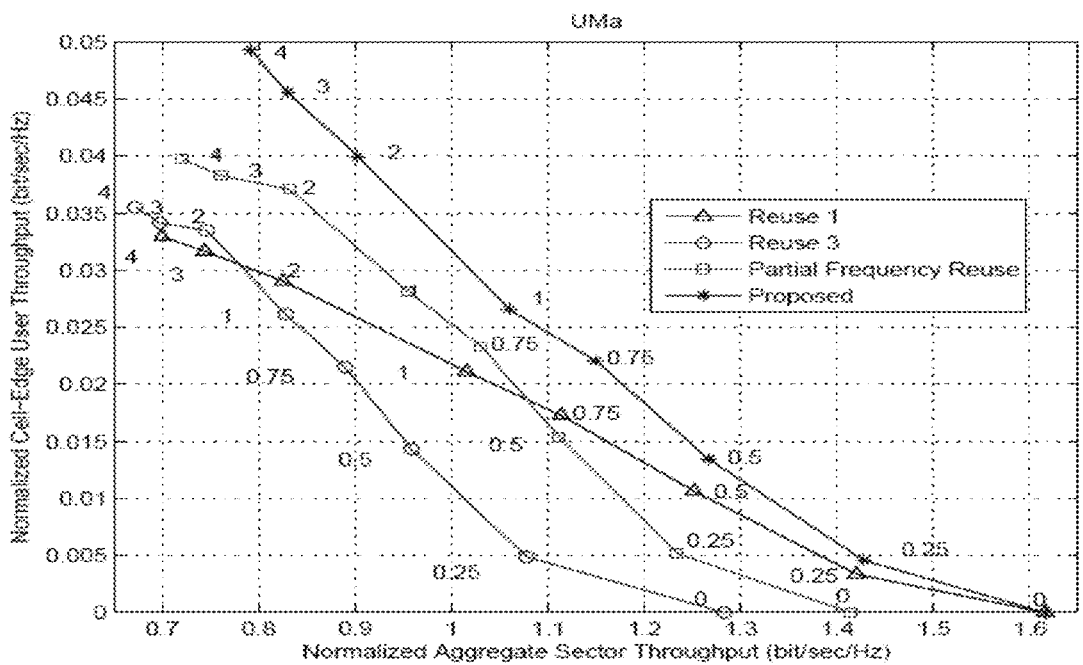

To examine the performance of the different schemes, FIG. 16 shows the normalized cell-edge user throughput and the normalized aggregate sector throughput for all schemes and for different fairness exponents. The general trend for all schemes (as expected) is that as $\mu$ increases (high degree of fairness), the sector throughput decreases and the cell-edge user throughput increases. For high $\mu$, reuse 3, PFR, and the simulated embodiment of the ICIC model have significantly higher cell-edge throughput than reuse 1. On the other hand, for small $\mu$ it is clear that both reuse 3 and PFR incur significant loss in the aggregate sector throughput as compared to reuse 1. Interestingly, the simulated embodiment of the ICIC model performs very well in both the cell-edge and the sector throughput as compared to all other schemes for all values of $\mu$. For the case of $\mu=0$, which corresponds to max-SINR scheduler, the proposed scheme converges to reuse 1. This is the case because max-SINR scheduler favors the cell-center user terminals which usually receive minimal interference from neighboring sectors; thus, resource block restriction is not needed.

Figure 17:
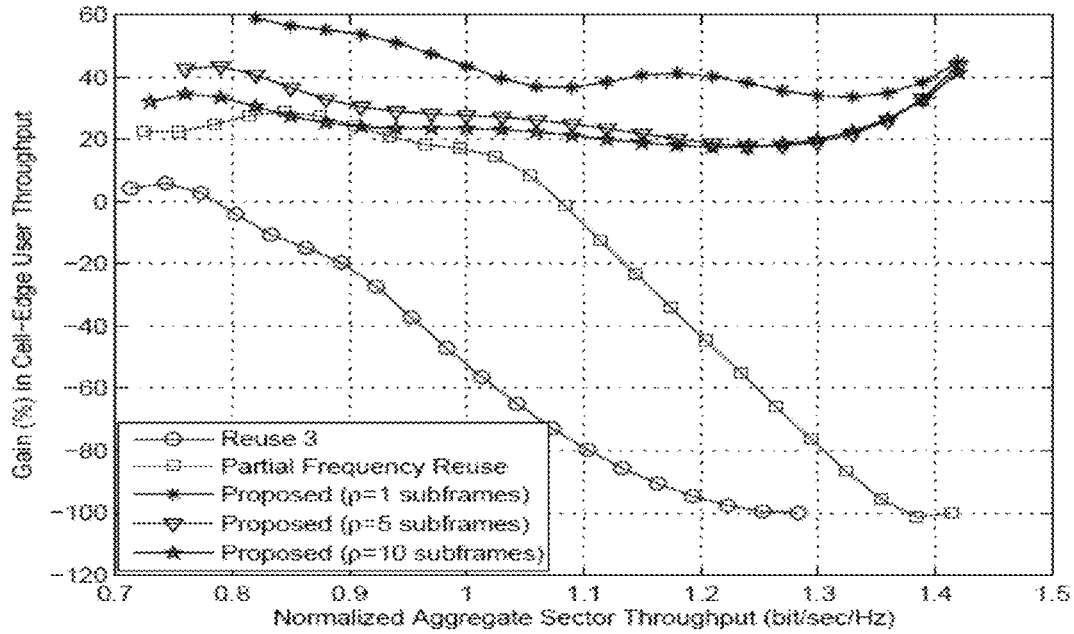
Figure 18:
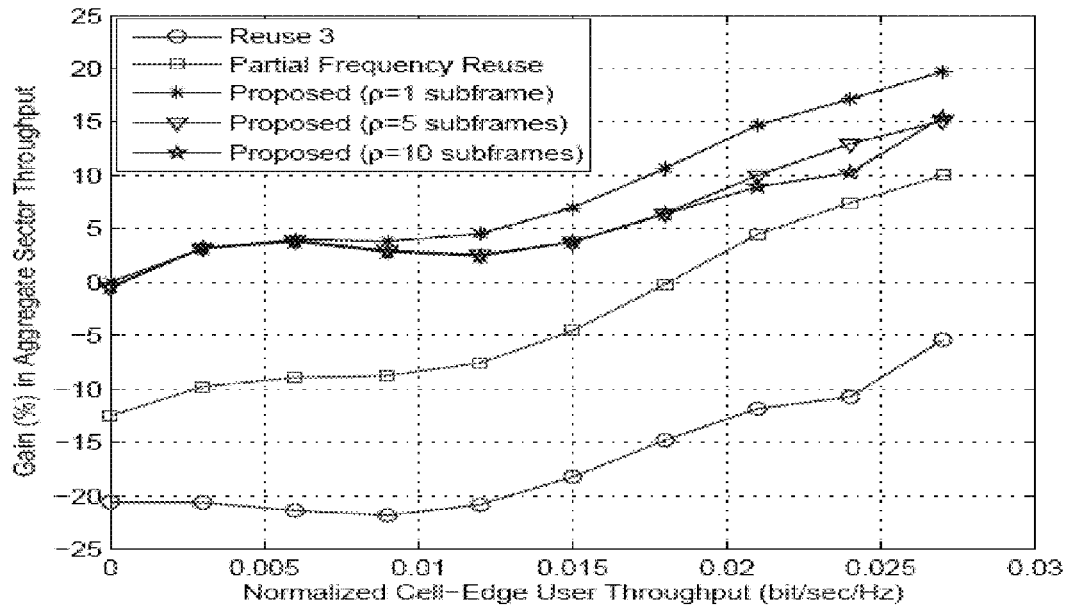

FIGS. 17 and 18 present a closer look at the gains achieved by the different schemes as compared to reuse 1. In FIG. 17, the gains in cell-edge throughput achieved for a given aggregate sector throughput are plottted. For a wide range of aggregate sector throughput, the simulated embodiment of the ICIC model achieves large gains (40% to 60%). The simulated embodiment of the ICIC model loses some of the gain if it is executed every 5 or 10 subframes; however, the gains are still better than the other schemes. PFR and reuse 3 achieve gains for small aggregate sector throughput; however, they both incur significant loss for high aggregate sector throughput. In FIG. 18, the gains in aggregate sector throughput for a given cell-edge throughput are plotted. The simulated embodiment of the ICIC model achieves higher gains in aggregate sector throughput than the other schemes, especially for high cell-edge throughput.

Figure 19:
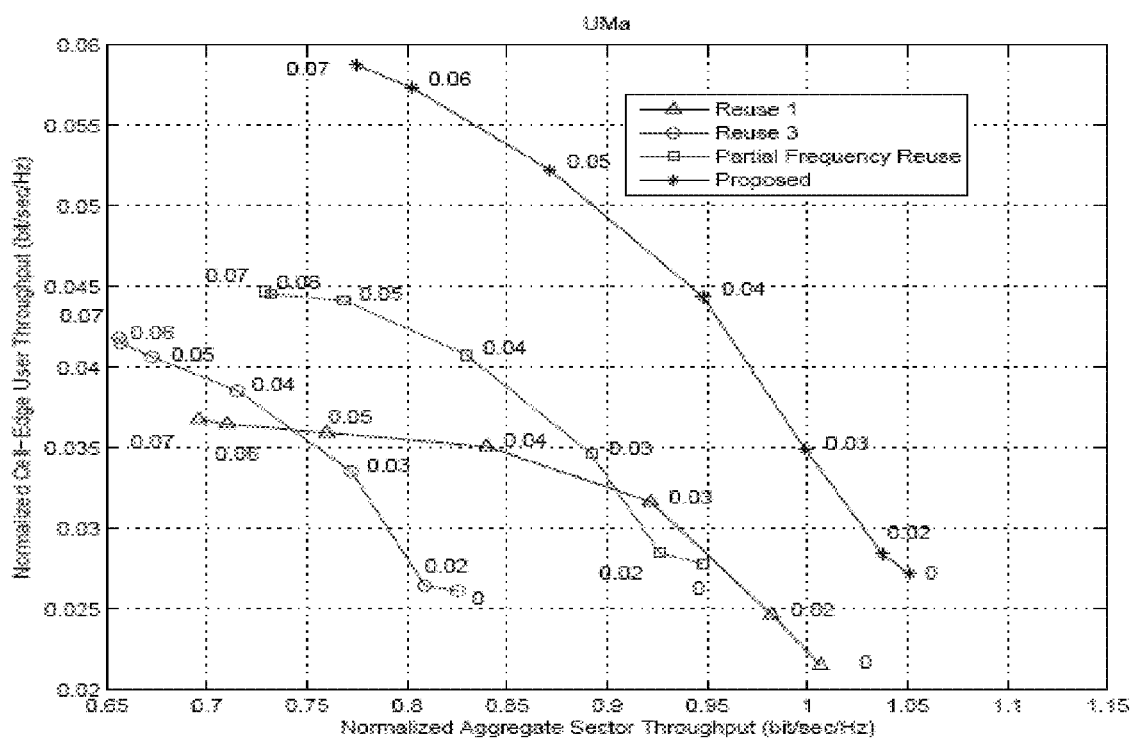

The trade-off between cell-edge user throughput and the normalized aggregate sector throughput using proportional-fair scheduler ($\mu=0$) with different minimum rate guarantee ($R_{min}$) is shown in FIG. 19. The simulated embodiment of the ICIC model significantly outperforms other schemes in both cell-edge and aggregate sector throughput, especially for high $R_{min}$.

Figure 20:
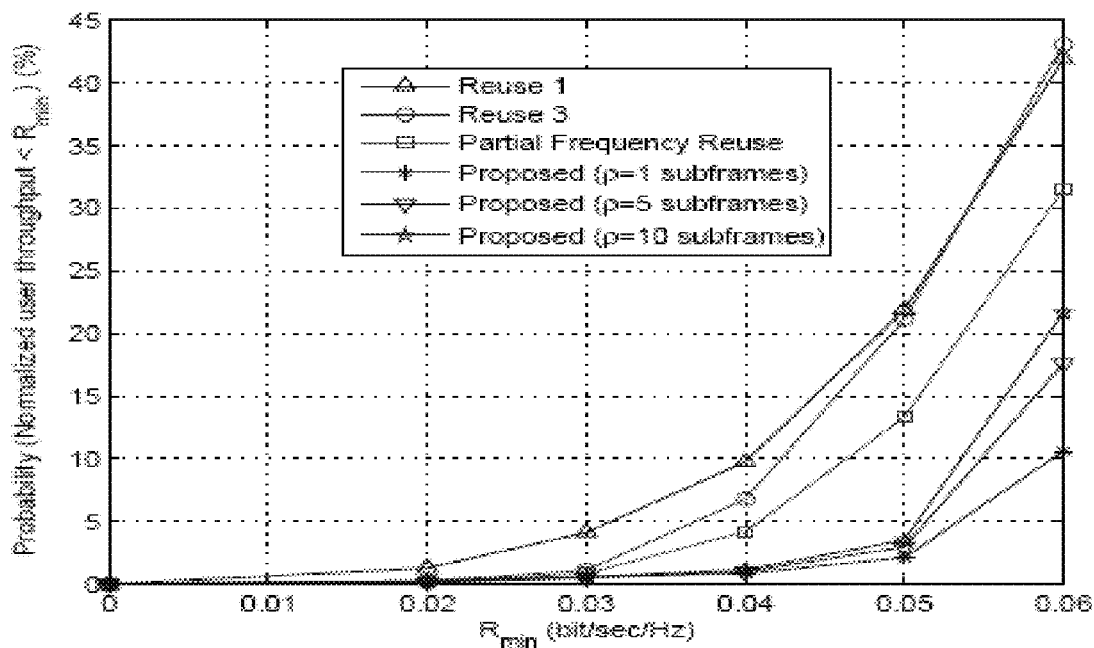

FIG. 20 plots the outage probability, which is defined as the probability of having the average user terminal throughput less than $\bar{R}_{min}$ for different schemes. It is clear from the figure that the proposed scheme achieves much lower outage probability as compared to other schemes. For example, at $\bar{R}_{min}=0.05$ bits/sec/Hz, the simulated embodiment of the ICIC model has an outage probability that is at least 3.5 times less than PFR and at least 6 times less than reuse 1 and reuse 3.

In summary, embodiments according to the present disclosure provide a novel ICIC model that runs in polynomial time and exhibits fast convergence, and finds near-optimum dynamic resource partitioning for application in a wireless network. The ICIC model is developed through a rigorous mathematical formulation in order to achieve near-optimality in polynomial time. The ICIC model is developed using a primal-decomposition method, which is used to decompose the problem into a master problem and multiple sub-problems. The master problem is solved iteratively using a projected sub-gradient method while each of the sub-problems is solved using MCNF. This is advantageous because, by exploiting an MCNF structure, the complexity of the solution is significantly reduced compared to general purpose convex or linear programming solutions.

In contrast to static partitioning schemes, such as reuse 3 and PFR, embodiments of an ICIC model according to the present disclosure have been demonstrated (through simulation) as being able to achieve high cell-edge user throughput (comparable to reuse 3 and PFR) without any penalty on the aggregate throughput. In general, embodiments of an ICIC model are efficient and are expected to contribute to the success of current and future cellular networks.

Embodiments according to the present disclosure can be implemented according to current LTE standards and in future cellular networks such as Hetnet. The ICIC model is expected to improve global (network-wide) performance and can be used with differentiable or non-differentiable AMC functions, including discrete-rate AMC schemes. The ICIC model can be implemented in a distributed manner or in a centralized manner.

Although the present disclosure and its advantages have been described in detail, it should be understood that various changes, substitutions, and alterations can be made without departing from the spirit and scope of the disclosure as defined by the appended claims.

What is claimed is:

1. A method for managing a wireless network, the method comprising:
   accessing, by a communications controller, a first value for a power level variable associated with a first resource block that is allocated by a first base station that serves a first sector of the wireless network;
   updating, by the communications controller, the first value for the power level variable according to an iterative process having multiple cycles, each cycle of the iterative process comprising: i) receiving a second value from a second base station that serves a second sector of the wireless network, the second value corresponding to the effect of power level for a second resource block allocated by the second base station on a measure of utility for the second sector; and ii) determining an updated value for the power level variable according to the second value; and
   setting, by the communications controller, a transmit power level for the first resource block according to the updated value.

2. The method of claim 1, further comprising rounding the updated value to the nearest binary value, wherein the first resource block is turned on if the updated value has a first binary value and turned off if the updated value has a second binary value.

3. The method of claim 1, further comprising allocating the first resource block to a user terminal in the first sector according to the updated value.

4. The method of claim 1, wherein the iterative process further comprises:
   accessing a third value corresponding to the effect of the transmit power level for the first resource block on a measure of utility for the first sector, wherein the third value is determined according to the first value; and
   determining the updated value for the power level variable according to the sum of the second and third values.

5. The method of claim 4, wherein the third value comprises a sub-gradient value calculated for the first resource block using a minimum network cost flow (MCNF)-structured model, and wherein the second value comprises a sub-gradient value calculated for the second resource block using the MCNF-structured model.

6. The method of claim 5, wherein the iterative process is performed a prescribed number of cycles, each of the cycles comprising:
   determining a first sub-gradient value for cycle N of the iterative process, the first sub-gradient associated with a resource block that is allocated by the first base station, the first sub-gradient determined according to a power level variable value for the resource block;
   sending the first sub-gradient value for cycle N of the iterative process to the second base station;
   receiving a second sub-gradient value for cycle N of the iterative process from the second base station;
   updating the power level variable value for the resource block according to the sum of the first and second sub-gradient values;
   sending the updated power level variable value for the resource block to the second base station; and
   receiving a power level variable value from the second base station, wherein the first sub-gradient value is updated in cycle N+1 of the iterative process according to the updated power level variable value for the resource block and the power level variable value from the second base station.

7. The method of claim 1, further comprising:
   sending the updated value for the power level variable from the first base station to the second base station; and
   receiving, from the second base station, a value for a power level variable associated with the second resource block.

8. The method of claim 1, further comprising determining a data transmission rate according to the transmit power level for the first resource block.

9. The method of claim 1, wherein the measure of utility comprises a weighted sum data transmission rate of all user terminals in the first sector.

10. The method of claim 1, wherein the communications controller is implemented by the first base station.

11. The method of claim 1, wherein the communications controller comprises a centralized node configured to communicate with the first and second base stations.

12. The method of claim 1, wherein the first sector comprises a portion of a first cell and the second sector comprises a portion of a second cell that neighbors the first cell.

13. A communications controller comprising:
   a processor configured to access a first value for a power level variable associated with a first resource block that is allocated by a first base station that serves a first sector of a wireless network; the processor further configured to update the first value for the power level variable according to an iterative process having multiple interations, each iteration of the iterative process comprising determining an updated value for the power level variable according to a second value, wherein the second value corresponds to the effect of power level for a second resource block allocated by a second base station on a measure of utility for a second sector of the wireless network served by the second base station; the processor further configured to set a transmit power level for the first resource block according to the updated value; and
   an antenna coupled to the processor and configured to receive the second value from the second base station.

14. The communications controller of claim 13, wherein the processor is further configured to round the updated value to the nearest binary value, wherein the first resource block is turned on if the updated value has a first binary value and turned off if the updated value has a second binary value.

15. The communications controller of claim 13, wherein the processor is further configured to allocate the first resource block to a user terminal in the first sector according to the updated value.

16. The communications controller of claim 13, wherein the iterative process further comprises accessing a third value corresponding to the effect of the transmit power level for the first resource block on a measure of utility for the first sector, wherein the third value is determined according to the first value, and determining the updated value for the power level variable according to the sum of the second and third values.

17. The communications controller of claim 16, wherein the third value comprises a sub-gradient value calculated for the first resource block using a minimum network cost flow (MCNF)-structured model, and wherein the second value comprises a sub-gradient value calculated for the second resource block using the MCNF-structured model.

18. The communications controller of claim 13, wherein the antenna is further configured to send the updated value for the power level variable from the first base station to the second base station, and receive, from the second base station, a value for a power level variable associated with the second resource block.

19. The communications controller of claim 13, wherein the processor is further configured to determine a data transmission rate according to the transmit power level for the first resource block.

20. The communications controller of claim 13, wherein the measure of utility comprises a weighted sum data transmission rate of all user terminals in the first sector.

21. The communications controller of claim 13, wherein the first base station comprises the communications controller.

22. The communications controller of claim 13, wherein the communications controller comprises a centralized node configured to communicate with the first and second base stations.

23. An inter-cell interference coordination method for a wireless network, the method comprising:

performing, with a communications controller, an iterative process comprising:
  determining a sub-gradient value according to a value of a transmit power level variable for a resource block allocated by a first base station that services a first sector in the wireless network, wherein the sub-gradient value is determined according to the weighted sum data transmission rate for user terminals in the first sector;
  sending the sub-gradient value to a second base station in a second sector that neighbors the first sector;
  receiving a sub-gradient value from the second base station;
  updating the value of the transmit power level variable according to the sum of the sub-gradient sent to the second base station and the sub-gradient received from the second base station;
repeating, by the communications controller, the iterative process a prescribed number of times to generate a final value for the transmit power level variable; and
setting, by the communications controller, a transmit power level for the resource block according to the updated value.

24. The method of claim 23, further comprising rounding the final value to the nearest binary value, wherein the resource block is turned on if the updated value has a first binary value and turned off if the updated value has a second binary value.

25. The method of claim 23, further comprising determining a data transmission rate according to the transmit power level for the resource block.

26. The method of claim 23, further comprising allocating the resource block to a user terminal in the first sector according to the final value for the transmit power level variable.

* * * * *